(12) United States Patent
Dong et al.

(10) Patent No.: US 11,074,092 B2
(45) Date of Patent: Jul. 27, 2021

(54) VIRTUAL MACHINE BATCH LIVE MIGRATION

(71) Applicant: Intel Corporation, Santa Clara, CA (US)

(72) Inventors: Yao Zu Dong, Shanghai (CN); Yuyang Du, Beijing (CN); Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/775,982

(22) PCT Filed: Dec. 18, 2015

(86) PCT No.: PCT/CN2015/097863
§ 371 (c)(1),
(2) Date: May 14, 2018

(87) PCT Pub. No.: WO2017/101100
PCT Pub. Date: Jun. 22, 2017

(65) Prior Publication Data
US 2018/0329737 A1    Nov. 15, 2018

(51) Int. Cl.
*G06F 9/455*    (2018.01)
*G06F 9/50*    (2006.01)

(52) U.S. Cl.
CPC .......... *G06F 9/45558* (2013.01); *G06F 9/455* (2013.01); *G06F 9/5077* (2013.01);
(Continued)

(58) Field of Classification Search
CPC ................................................ G06F 9/45533
(Continued)

(56) References Cited

U.S. PATENT DOCUMENTS

2010/0205252 A1*   8/2010   Dorai .................... G06F 9/4856
709/205
2010/0299666 A1*   11/2010   Agbaria ................ G06F 9/4856
718/1
(Continued)

FOREIGN PATENT DOCUMENTS

CN     103885829 A    6/2014
CN     103955399 A    7/2014
(Continued)

OTHER PUBLICATIONS

International Search Report received in PCT Application No. PCT/CN2015/097863, dated Dec. 18, 2015, 6 pages.
(Continued)

*Primary Examiner* — Mehran Kamran
(74) *Attorney, Agent, or Firm* — Hanley, Flight & Zimmerman, LLC

(57) ABSTRACT

A virtual machine migration controller may perform the live migration of a plurality of virtual machines from a first physical host system to a second physical host system. The virtual machine migration controller may determine a memory page dirty rate for each of a plurality of virtual machines. The virtual machine migration controller may additionally identify virtual machines that share memory pages and/or map to different memory pages having, at least in part, identical data or information. The virtual machine migration controller may group virtual machines demonstrating commonality among mapped memory pages. The virtual machine migration controller may determine a projected migration time based on the dirtying rate, the commonality of memory pages, and the available bandwidth. The virtual machine migration controller orders and transfers virtual machine groups based on the projected migration time.

25 Claims, 6 Drawing Sheets

(52) U.S. Cl.
CPC ............... *G06F 2009/4557* (2013.01); *G06F 2009/45583* (2013.01); *G06F 2009/45595* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 2011/0131568 A1* | 6/2011 | Heim | .................... | G06F 9/4856 718/1 |
| 2011/0131571 A1* | 6/2011 | Heim | .................. | G06F 9/45558 718/1 |
| 2011/0213911 A1* | 9/2011 | Eidus | .................... | G06F 9/4856 711/6 |
| 2012/0254860 A1* | 10/2012 | Bozek | ..................... | G06F 9/461 718/1 |
| 2012/0278525 A1* | 11/2012 | Serebrin | ............. | G06F 11/1451 711/6 |
| 2013/0024598 A1* | 1/2013 | Serebrin | ................. | G06F 12/10 711/6 |
| 2013/0086272 A1* | 4/2013 | Chen | ..................... | G06F 9/4856 709/226 |
| 2014/0115162 A1* | 4/2014 | Kalyanaraman | ........................... | H04L 29/08954 709/226 |
| 2014/0115164 A1* | 4/2014 | Kalyanaraman | ........................... | H04L 29/08954 709/226 |
| 2014/0196037 A1* | 7/2014 | Gopalan | ............... | G06F 9/4856 718/1 |
| 2014/0281117 A1* | 9/2014 | Hepkin | ............... | G06F 9/45533 711/6 |
| 2014/0359607 A1* | 12/2014 | Tsirkin | ...................... | G06F 9/48 718/1 |
| 2015/0052322 A1* | 2/2015 | Tsirkin | ................. | G06F 9/4856 711/162 |
| 2015/0052323 A1* | 2/2015 | Noel | ....................... | G06F 12/00 711/162 |
| 2015/0149999 A1* | 5/2015 | Ramanathan | ......... | G06F 9/4856 718/1 |
| 2015/0193250 A1* | 7/2015 | Ito | ......................... | G06F 9/4856 718/1 |
| 2015/0261581 A1* | 9/2015 | Wang | .................. | G06F 9/45558 711/162 |
| 2015/0277962 A1* | 10/2015 | Tsirkin | ...................... | G06F 9/48 718/1 |
| 2015/0331715 A1* | 11/2015 | Sathyanarayana | ...... | H04L 67/10 709/226 |
| 2016/0026489 A1* | 1/2016 | Maislos | .............. | G06F 9/45558 718/1 |
| 2016/0139962 A1* | 5/2016 | Tsirkin | .................. | G06F 9/5088 718/1 |
| 2016/0378532 A1* | 12/2016 | Vincent | ............... | G06F 9/45558 718/1 |
| 2017/0046185 A1* | 2/2017 | Tsirkin | ................ | G06F 9/45558 |
| 2018/0024854 A1* | 1/2018 | Wang | .................... | G06F 9/5088 718/1 |
| 2018/0136971 A1* | 5/2018 | Dong | .................. | G06F 9/45558 |
| 2018/0246751 A1* | 8/2018 | Dong | .................... | G06F 9/4856 |

FOREIGN PATENT DOCUMENTS

| | | |
|---|---|---|
| CN | 105100184 A | 11/2015 |
| CN | 107015844 A | 8/2017 |
| JP | 2009-146161 A | 7/2009 |
| JP | 2010231684 A | 10/2010 |
| JP | 2014-153997 A | 8/2014 |
| JP | 2015152984 A | 8/2015 |
| JP | 2017117440 A | 6/2017 |
| WO | 2013015217 A1 | 1/2013 |

OTHER PUBLICATIONS

International Preliminary Report on Patentability received in PCT Application No. PCT/CN2015/097863, dated Dec. 18, 2015, 4 pages.
Japanese Office Action received in Japanese Application No. 2016-224129, dated Nov. 7, 2017, 8 pages.
Japanese Notice of Allowance received in Japanese Application No. 2016-224129, dated Feb. 22, 2018, 6 pages.
Search Report and Written Opinion issued in Singapore Application No. 10201609126T, dated Oct. 10, 2019, 8 pages.
Deshpande U. et al., "Live Gang Migration of Virtual Machines," Proceedings of the 20th international symposium on High performance distributed computing, Jun. 11, 2011, 12 pages.
Riteau P. et al., Shrinker: Improving Live Migration of Virtual Clusters over WANs with Distributed Data Deduplication and Content-Based Addressing, Euro-Par 2011: Euro-Par 2011 Parallel Processing, Sep. 2, 2011, 13 pages.
China Office Action from related China Application 201611016129.7, dated Mar. 26, 2020.
Intellectual Property Office of Singapore, "Notice of Eligibility for Grant," issued in connection with application No. 10201609126T, dated Jul. 28, 2020, 1 page.
Intellectual Property Office of Singapore, "Examination Report," issued in connection with application No. 10201609126T, dated Jul. 28, 2020, 4 pages.
State Intellectual Property Office of China, "Third Office Action", issued in connection with Chinese Patent Application No. 201611016129.7, dated Feb. 2, 2021, (4 pages).
State Intellectual Property Office of China, "Notification to Grant Patent Right for Invention", issued in connection with Chinese Patent Application No. 201611016129.7, dated May 26, 2021, (4 pages).

* cited by examiner

VIRTUAL MACHINE BATCH LIVE MIGRATION

CROSS-REFERENCE TO RELATED APPLICATIONS

This present application is a National Phase Application Filed Under 35 U.S.C. 371 claiming priority to PCT/CN2015/097863 filed Dec. 18, 2015, the entire disclosure of which is incorporated herein by reference.

TECHNICAL FIELD

The present disclosure relates to migration of virtual machines.

BACKGROUND

A virtual machine ("VM") is an emulation of a particular operating environment. Virtual machines operate based on the computer architecture and functions of a real or hypothetical computer, and the implementation may involve specialized hardware, software or both. Virtual machines may be classified based on the degree to which the functionality of the target real machine is implemented within the virtual machine. System virtual machines provide a complete substitute for the targeted real machine and a level of functionality required to support the execution of a complete operating system. Process virtual machines are designed to execute a single application by providing an abstracted and platform independent program execution environment.

Virtual machines may be implemented locally or remotely, for example on one or more host devices such as one or more remote server systems. Occasionally, it may become necessary to migrate a number of virtual machines from a first remote host device to a second remote host device. Live migration of virtual machines relocates virtual machines across physical hosts while the virtual machine continues operation. Virtual machines may be migrated across physical hosts to improve service availability, increase resource utilization, simplify management of the physical hosts, perform server maintenance, or load balance across a number of physical hosts. The live migration of virtual machines is a key technique in virtualized data centers and in cloud-based operating systems such as Openstack.

With increasing hardware capacity, the ability for a single device to support a large number of collocated virtual machines continues to increase. With increasing numbers of collocated virtual machines, the likelihood that any number of virtual machines being contemporaneously migrated increases. Similarly, the likelihood of overlap between migrations and/or the migration of all virtual machines from a first physical host to a second physical host will also tend to increase with increasing numbers of virtual machines.

As an alternative, virtual machines may be individually migrated on a sequential or scheduled basis. However, benefits exist when a plurality of virtual machines are migrated as a group:

When the virtual machines include inter-VM communication channels, the virtual machines should be migrated in parallel and resumed at the same time in the destination physical host. Sequential migration of such virtual machines may result in a failure due to the interruption of the inter-VM communication channels as the virtual machines are individually migrated between physical hosts.

Virtual machines collocated on a common physical host may share a large number of memory pages, individually migrating such virtual machines may result in the migration of a large number of duplicate memory pages. Such duplication is wasteful of both storage capacity on the destination physical host as well as bandwidth across the network used to migrate the virtual machines.

With container VM cases (such as Intel's Clear Container) a massive number of virtual machines may exist on a single host. In such an implementation, the virtual machines likely share a number of memory pages and also communicate with each other—under such conditions, batch migration of the virtual machines is advantageous.

Most known virtual machine migration solutions only transfer individual virtual machines or transfer all virtual machines implemented on the source physical host. Such a migration regime is suboptimal since the migration of individual virtual machines or the migration of all virtual machines loses the opportunity to significantly reduce the data transferred between the source physical host and the destination physical host by identifying memory pages that are either shared or duplicated in whole or in part between virtual machines. Additionally, such solutions may suffer from migration failure due to non-converged dirty memory pages at the pre-copy phase.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
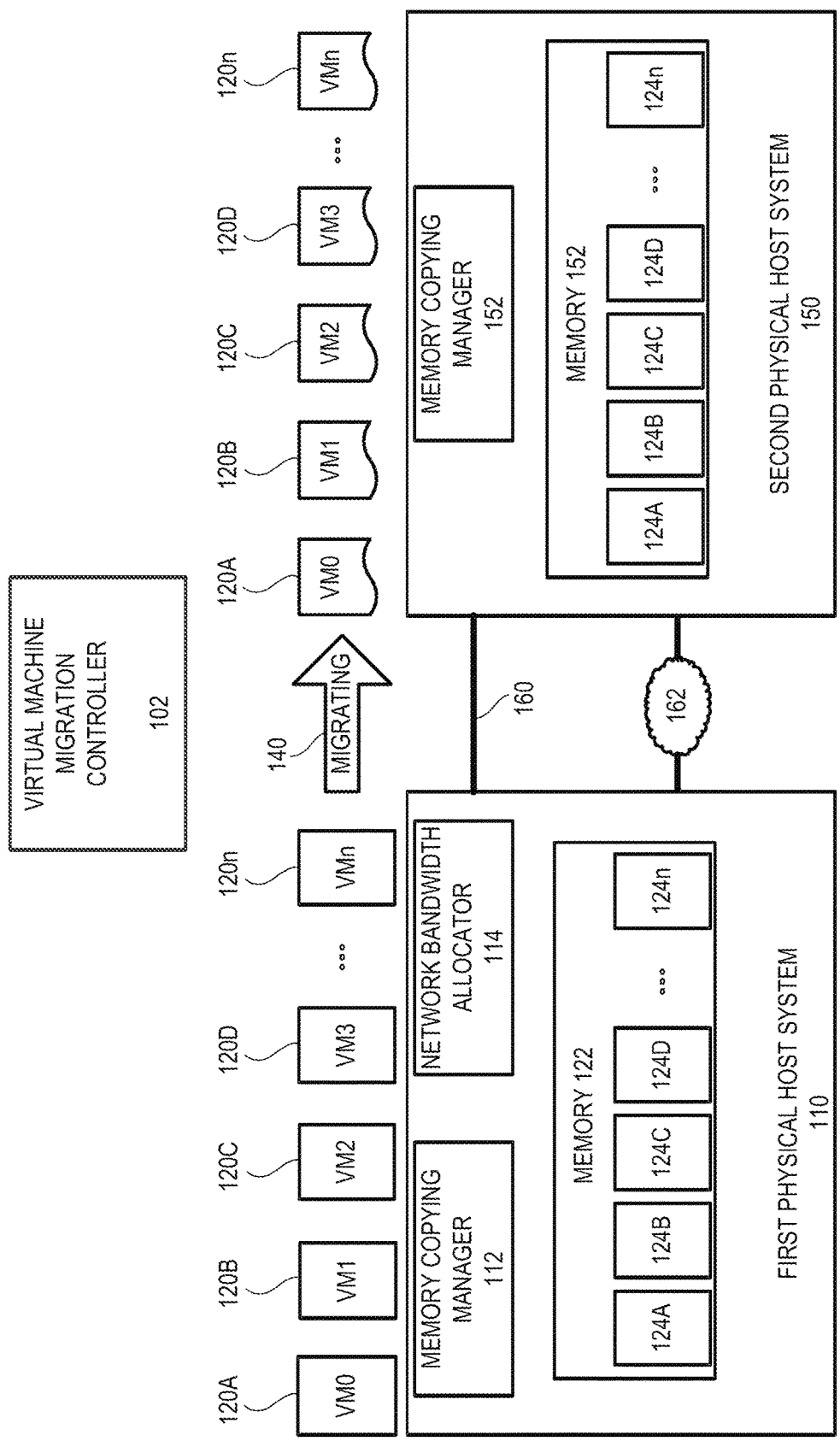
FIG. 1 is a schematic diagram of a live virtual machine migration system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

One aspect of migrating virtual machines between physical hosts is copying the changing memory of the target virtual machine as the virtual machine is still running from source host to destination. The memory pages associated with a virtual machine represents a significant portion of the data transfer and the network bandwidth over which the memory pages are transferred may constrain or otherwise limit the ability to expeditiously transfer memory pages between physical hosts. To address the issues associated with migrating a large number of data intensive memory pages, a live migration of virtual machines may be performed by:

Examining the memory pages logically associated with the virtual machines to be migrated that are stored in the memory of the source physical host to identify shared memory pages. Only one instance of the shared memory page is then transferred.

To increase the possibility of identifying shared or partially identical memory pages within the source physical host, a virtual machine live migration controller examines the memory pages at a granular level, looks at sub-pages at a granular level, and uses one or more data fingerprinting techniques to speed up the identification of shared, partially identical, or completely identical memory pages.

Since each virtual machine maintains a generally consistent memory page dirtying rate, the virtual machine live migration controller collects the writeable memory working-set pattern using a dirty-log mode to track the number of dirtied memory pages. The virtual machine live migration controller then dynamically predicts the memory working-set pattern at a given network bandwidth, including the convergence and duration and iteration spent for migration. Based on the predicted migration time, the virtual machine live migration controller selects a virtual machine group for migration at a given (or allocated) memory bandwidth to successfully complete the batch migration.

A system to live migrate a plurality of virtual machines from a first physical host to a second physical host is provided. The system may include at least one network interface communicably coupled to the first physical host and to the second physical host, and at least one circuit communicably coupled to the at least one network interface. The system may further include at least one storage device communicably coupled to the at least one circuit, the at least one storage device including machine-readable instructions that, when executed, cause at least a portion of the circuit to provide a virtual machine migration controller, the virtual machine migration controller to: for each virtual machine in a plurality of virtual machines hosted on the first physical host: determine a value indicative of the memory page dirtying rate logically associated with the respective virtual machine, selectively group at least some of the virtual machines in the plurality of virtual machines to provide a number of virtual machine groups, each virtual machine in a respective virtual machine group accessing an identical memory page content portion on the first physical host and dynamically predict a duration to migrate the respective virtual machine group based at least in part on: a single migration of the identical memory page content portion accessed by the virtual machines in the respective virtual machine group; an available bandwidth to migrate the respective virtual machine group from the first physical host to the second physical host; and the value indicative of the memory page dirtying rate logically associated with each of the virtual machines included in the respective virtual machine group.

Another live virtual machine migration system is provided. The system may include at least one controller circuit and at least one storage device communicably coupled to the at least one controller circuit, the at least one storage device including machine-executable instructions that, when executed by the at least one controller circuit, cause the at least one controller circuit to provide a virtual machine migration controller. The virtual machine migration controller may determine a page dirtying rate for each of a plurality of virtual machines resident on a first host system; selectively group at least some of the plurality of virtual machines to form a number of virtual machine groups, each of the virtual machine groups including virtual machines that previously accessed at least one identical memory page content portion; and determine a projected migration time to migrate each of the number of virtual machine groups from the first host system to a second host system based at least in part on the at least one identical memory page content portion, the page dirtying rate for each of the virtual machines included in the respective group, and available network bandwidth.

A live virtual machine migration method is provided. The method may include, for each virtual machine in a plurality of virtual machines, determining a value indicative of the memory page dirtying rate logically associated with the respective virtual machine and selectively grouping virtual machines in the plurality of virtual machines to provide a number of virtual machine groups, each virtual machine in a respective virtual machine group accessing an identical memory page content portion. The method may further include, for each virtual machine group, dynamically predicting a duration to migrate the respective virtual machine group based at least in part on: a single migration of the identical memory page content portion accessed by the virtual machines in the respective virtual machine group; an available bandwidth to migrate the respective virtual machine group; and the value indicative of the memory page dirtying rate logically associated with each of the virtual machines included in the respective virtual machine group.

Another live virtual machine migration method is provided. The method may include determining, by a virtual machine migration controller, a page dirtying rate for each of a plurality of virtual machines. The method may further include selectively grouping, by the virtual machine migration controller, at least some of the plurality of virtual machines to form a number of virtual machine groups, each of the virtual machine groups including virtual machines that previously accessed at least one identical memory page content portion. The method may additionally include determining, by the virtual machine migration controller a projected migration time for each of the number of virtual machine groups based at least in part on the at least one identical memory page content portion, the page dirtying rate for each of the virtual machines included in the respective group, and available network bandwidth.

Another live virtual machine migration system is provided. The system may include, for each virtual machine in a plurality of virtual machines, a means for determining a value indicative of the memory page dirtying rate logically associated with the respective virtual machine. The system may additionally include a means for selectively grouping virtual machines in the plurality of virtual machines to provide a number of virtual machine groups, each virtual machine in a respective virtual machine group accessing an identical memory page content portion. The system may additionally include, for each virtual machine group, a means for dynamically predicting a duration to migrate the respective virtual machine group based at least in part on: a single migration of the identical memory page content portion accessed by the virtual machines in the respective virtual machine group; an available bandwidth to migrate the respective virtual machine group; and the value indicative of the memory page dirtying rate logically associated with each of the virtual machines included in the respective virtual machine group.

Another live virtual machine migration system is provided. The system may include a means for determining a page dirtying rate for each of a plurality of virtual machines implemented on a first hosting system. The system may further include a means for selectively grouping at least some of the plurality of virtual machines to form a number of virtual machine groups, each of the virtual machine groups including virtual machines that previously accessed at least one identical memory page content portion. The system may additionally include a means for determining a projected migration time for each of the number of virtual machine groups based at least in part on the at least one identical memory page content portion, the page dirtying rate for each of the virtual machines included in the respective group, and available network bandwidth.

As used herein, the terms "top" and "bottom" are intended to provide a relative and not an absolute reference to a location. Thus, inverting an object described as having a "top portion" and a "bottom portion" may place the "bottom portion" on the top of the object and the "top portion" on the bottom of the object. Such configurations should be considered as included within the scope of this disclosure.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

FIG. 1 is a schematic diagram of a live virtual machine migration system 100 in which a virtual machine migration controller 102 migrates 140 a number of virtual machines 120A-120n (collectively "virtual machines 120") from a first physical host 110 to a second physical host 150 communicably coupled via network 160, in accordance with at least one embodiment of the present disclosure. Any number of virtual machines 120 may be implemented on the first physical host system 110. For example, the first physical host system 110 may host 10 or more virtual machines 120; 50 or more virtual machines 120; 100 or more virtual machines 120; 500 or more virtual machines 120; or 1000 or more virtual machines 120. Each of the virtual machines 120 may implement the same or different operating systems and/or applications.

The first physical host system 110 may include one or more storage devices such as a memory 122. Some or all of the virtual machines 120 may be mapped to and/or logically associated with memory pages 124A-124n (collectively, "memory pages 124") stored or otherwise retained in the memory 122. Each of the memory pages 124 contains data and/or information generated and/or used by the virtual machines 120 mapped to the respective memory page 124. In embodiments, a single virtual machine 120 may be mapped to any number of memory pages 124. Each virtual machine 120 may intermittently, periodically, or aperiodically add, change, or delete data and/or information on the memory pages 124 to which the virtual machine 120 is mapped. The rate at which a particular virtual machine 120 may add, change, or delete information and/or data contained on a memory page 124 may be referred to as the "page dirtying rate" or simply the "dirtying rate" of the respective virtual machine 120. The virtual machines 120 may have similar or different dirtying rates.

In some implementations, a number of virtual machines 120 may be mapped to a single memory page 124. In such implementations, the single memory page 124 that may be considered as "shared" between or by the respective virtual machines 120. In some implementations, portions of memory pages 124 mapped to, but not shared by, different virtual machines 120 may include similar or identical data and/or information. In some implementations, entire memory pages 124 mapped to, but not shared by, different virtual machines 120 may contain similar or identical information and/or data. Thus, in some implementations, the information and/or data included on different memory pages 124 may be similar or identical and, consequently, a significant quantity of redundant information and/or data may be present in the memory 122 of the first physical host system 110. The systems and methods described herein are beneficially able to identify memory pages 124 mapped to and shared between multiple virtual machines 120 and memory pages 124 that contain similar or identical information and/or data and are mapped to different virtual machines 120.

In embodiments, all or a portion of a memory copying manager 112 may be disposed in the first physical host system 110, as depicted in FIG. 1. In other embodiments, all or a portion of the memory copying manager 112 may be disposed in the virtual machine migration controller 102. Regardless of the location of the memory copying manager 112, the memory copying manager 112 is communicably coupled to the virtual machine controller 102. The memory copying manager 112 may scan or otherwise analyze some or all of the memory pages 124 to identify duplicate memory pages 124 (i.e., different memory pages 124 containing the same information and/or data) that are mapped to different virtual machines 120. The memory copying manager 112 may scan or otherwise analyze some or all of the memory pages 124 to identify partially duplicate memory pages 124 (i.e., different memory pages 124 containing at least a portion of the same information and/or data) that are mapped to different virtual machines 120.

In some implementations, the memory copying manager 112 may analyze at least a portion of the memory pages 124 mapped to a number of virtual machines 120 to identify those memory pages 124 that, in whole or in part, contain duplicate information and/or data. In some implementations, the memory copying manager 112 may analyze memory pages 124 on a temporal basis. For example, the memory copying manager 112 may analyze memory pages 124 on a regular, an irregular, or a periodic basis. In some implementations, the memory copying manager 112 may analyze memory pages 124 on an event driven basis. For example, the memory copying manager 112 may analyze memory pages 124 upon receiving one or more messages or indicators of an impending migration of some or all of the virtual machines 120 from the first physical host 110 to the second physical host 150. In some embodiments, the virtual machine migration controller 102 may provide the memory copying manager 112 with the message or indicator of an impending migration of some or all of the virtual machines 120 from the first physical host 110 to the second physical host 150.

The memory copying manager 112 may use any current or future developed analysis technique to identify memory pages 124 containing, at least in part, duplicate information and/or data. For example, the memory copying manager 112 may generate and compare the fingerprints for some or all of the memory pages 124 on the first physical host 110. The memory copying manager may perform such fingerprinting using any current or future developed fingerprinting technique, such as Rabin's algorithm, which reduces each memory page 124 to a relatively short data string that is unique to the content contained on the memory page 124. In embodiments, the memory copying manager 112 may compare the fingerprints for each memory page 124 to identify candidate memory page matches. To confirm the content of the candidate matching memory pages 124 is identical, the memory copying manager 112 may compare the candidate matching memory pages 124 on a byte-by-byte basis to confirm the candidate matching memory pages 124 are indeed identical. In embodiments, the memory copying manager 112 may use one or more hashing functions to identify identical portions of two or more memory pages 124.

The virtual machine migration controller 102 may be a stand-alone controller, or may be implemented as a portion of a larger control device. In embodiments, the virtual machine migration controller 102 may include one or more communicably coupled storage devices. In some implementations, the virtual machine migration controller 102 may include one or more controller circuits capable of executing one or more machine-executable instruction sets. The one or more machine-executable instruction sets may be stored or otherwise retained, in whole or in part, in one or more communicably coupled storage devices. In some implementations, the virtual machine migration controller 102 may be executed, in whole or in part, by the first physical host system 110. In some implementations, the virtual machine migration controller 102 may be executed, in whole or in part, by the second physical host system 150. In some implementations, the virtual machine migration controller 102 may be executed by one or more devices external to both the first physical host system 110 and the second physical host system 150.

The virtual machine migration controller 102 controls the migration 140 of the virtual machines 120 from the first physical host system 110 to the second physical host system 150. In at least some implementations, the first physical host system 110 may be hardwire coupled 160 (e.g., located on another blade server in a common rack) to the second physical host system 150. In such implementations, the migration 140 of the virtual machines 120 may occur, in whole or in part, via the hardwire connection 160. In some implementations, the first physical host system 110 may be communicably coupled to the second physical host system 150 via one or more networks 162. In such implementations, the migration 140 of the virtual machines 120 may occur via the network connection 162.

The first physical host system 110 may include one or more network bandwidth allocators 114. The network bandwidth allocator 114 may partition, dedicate, or otherwise allocate available network bandwidth to the virtual machine migration 140. Such bandwidth allocation may be based in whole or in part on bandwidth requirements of other processes currently executed on the first physical host system 110. In some embodiments, the network bandwidth allocator 114 may communicate the available bandwidth for virtual machine migration 140 to the virtual machine migration controller 102.

Figure 2A:
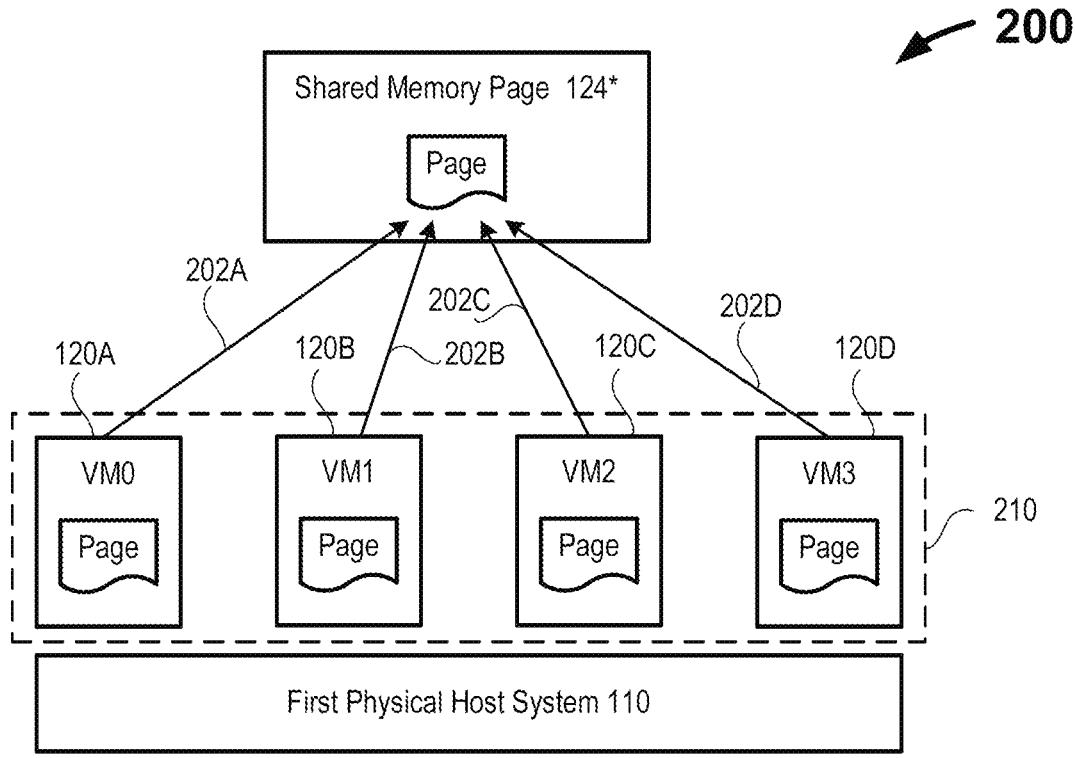
FIG. 2A is a schematic of an illustrative system in which four virtual machines implemented on a first physical host share a common memory page stored in the same memory location in the first physical host, in accordance with at least one embodiment of the present disclosure.

FIG. 2A is a schematic of an illustrative system 200 in which a plurality of virtual machines 120A-120D executing on a first physical host system 110 map (202A-202D) to a common memory page 124, in accordance with at least one embodiment of the present disclosure. In some implementations, a plurality of virtual machines 120 may map to a single, shared, memory page 124\*. The shared memory page 124\* may be stored or otherwise retained in the memory 122 of the first physical host system 110.

In embodiments, the memory copying manager 112 may identify the plurality of virtual machines 120 as mapping 202 to the common or shared memory page 124\*. In embodiments, the virtual machine migration controller 102 may identify the plurality of virtual machines 120 as mapping 202 to a common or shared memory page 124\*. In such embodiments, the virtual machine migration controller 102 may selectively group 210 the plurality of virtual machines 120 for migration 140 to the second physical host system 150 based at least in part on the common or shared memory page 124\*. By selectively grouping the plurality of virtual machines 120 for migration, the virtual machine migration controller 102 is able to complete the migration using only a single instance of the shared memory page 124\*. In contrast, if the virtual machine migration controller 102 migrated each of the plurality of virtual machines 120 separately, the shared memory page 124\* would be migrated once for each of the virtual machines 120 included in the plurality of virtual machines 120. Thus, by grouping the plurality of virtual machines 120 that share the common memory page 124\*, bandwidth and migration time requirements are beneficially reduced.

Figure 2B:
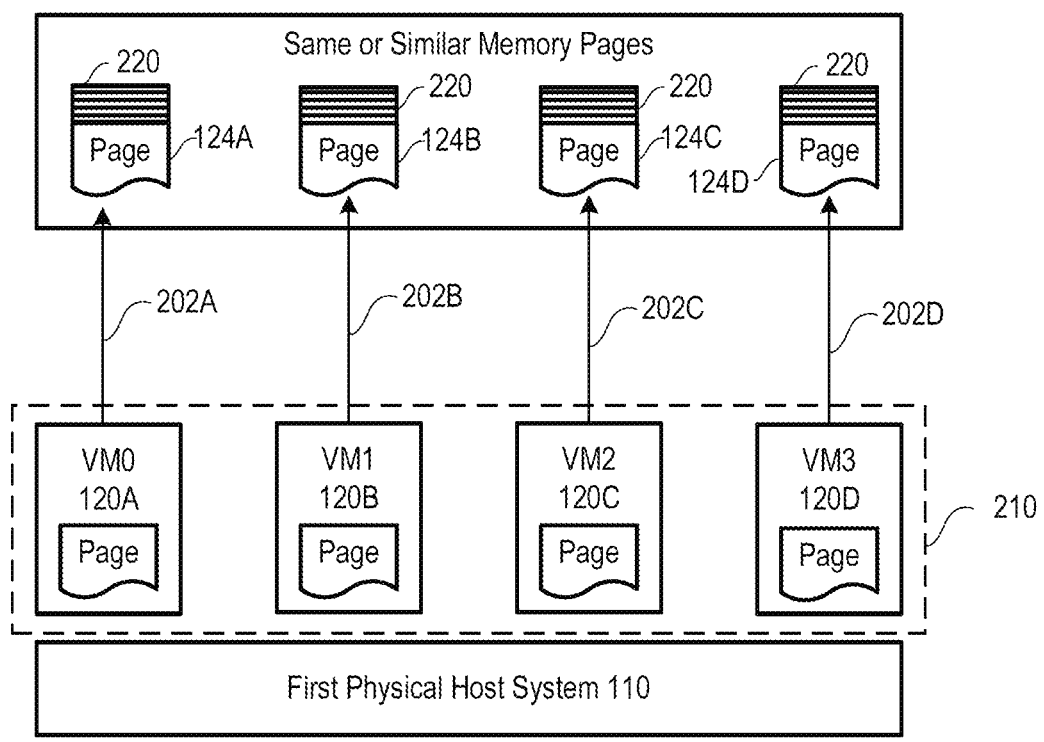
FIG. 2B is a schematic of an illustrative system in which four virtual machines implemented on a first physical host communicate data to a respective memory page and in which each of the memory pages have the same or similar data, in accordance with at least one embodiment of the present disclosure.

FIG. 2B is a schematic of an illustrative system 200 in which a plurality of virtual machines 120A-120D executing on a first physical host system 110 map (202A-202D) to different memory pages 124A-124D, however at least a portion of each of the memory pages 124 contains common information or data 220, in accordance with at least one embodiment of the present disclosure. In some implementations, a plurality of virtual machines 120 may map to different memory pages 124, however each of the different memory pages 124 may contain identical information or data 220. In such an instance, the memory pages 124 may be stored or otherwise retained in the memory 122 of the first physical host system 110.

In embodiments, the memory copying manager 112 may identify the plurality of virtual machines 120 as mapping 202 to different memory pages 124, each of which contains at least a portion of common information or data 220. In embodiments, some or all of the different memory pages 124 may contain identical information or data. In embodiments, the memory copying manager 112 may generate a fingerprint for each of the different memory pages 124. The memory copying manager 112 may compare the fingerprints for each of the different memory pages 124 to determine candidate matching memory pages 124 which may contain identical information or data. In embodiments, the memory copying manager 112 may compare candidate matching memory pages 124 on a byte-by-byte basis to determine whether the candidate matching memory pages 124 are, in fact, identical.

In embodiments, some or all of the different memory pages 124 may contain common or identical information or data sections, passages, or portions 220. In embodiments, the memory copying manager 112 may identify the common portions 220 of each of the different memory pages 124 using one or more hashing functions.

In such embodiments, the virtual machine migration controller 102 may selectively group 210 the plurality of virtual machines 120 for migration 140 to the second physical host system 150 based at least in part on the common or shared information or data contained on the different memory pages 124. By selectively grouping the plurality of virtual machines 120 for migration, the virtual machine migration controller 102 is able to complete the migration of the grouped virtual machines by migrating the common information or data only once rather than once for each of the virtual machines 120 included in the group 210. Thus, by grouping the plurality of virtual machines 120 that map to memory pages 124 that include common or identical information or data portions 220, bandwidth and migration time requirements are advantageously reduced.

Figure 3:
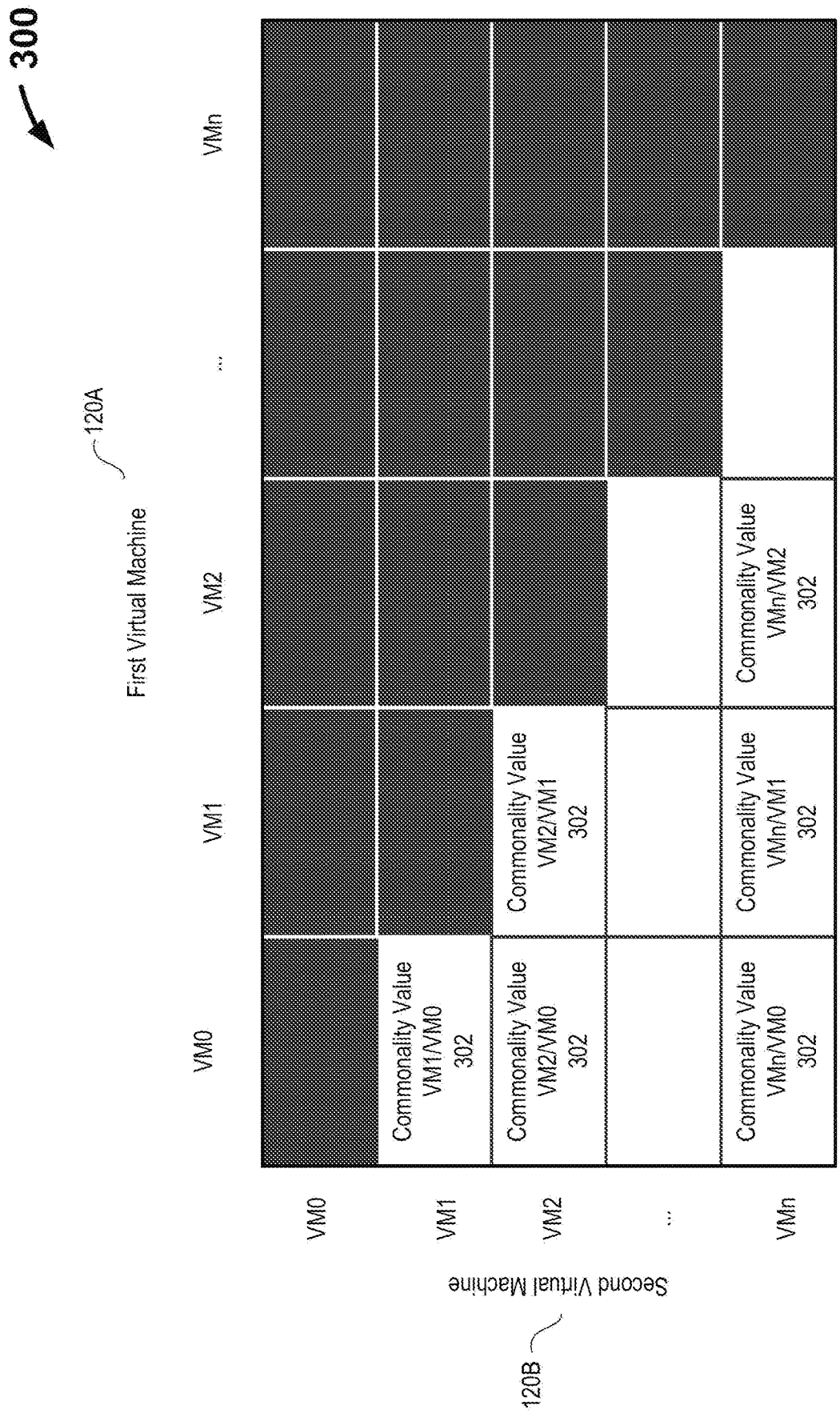
FIG. 3 is a chart 300 that includes data indicative of the degree of memory page commonality between every pair of virtual machines to be migrated, in accordance with at least one embodiment of the present disclosure.

FIG. 3 is a chart 300 that includes data indicative of the degree of memory page commonality 302 between every virtual machine pair 210, in accordance with at least one embodiment of the present disclosure. In some embodiments, the virtual machine migration controller 102 determines the degree to which single memory pages 124 are mapped to (i.e., shared by) different virtual machines 120 and/or the degree to which virtual machines 120 are mapped to different memory pages 124 that contain identical or common information or data. In embodiments, the virtual machine migration controller 102 may generate an output such as a chart 300 or other graph that includes data indicative of the degree of commonality between every pair of virtual machines 120 based on shared memory pages 124 and memory pages 124 having at least a portion of identical information or data that are mapped to the respective virtual machines 120. The chart 300 is thus populated with values 302 indicative of the degree to which a particular virtual machine pair 210 shares memory space within the memory 122 of the first physical host system 110.

Figure 4:
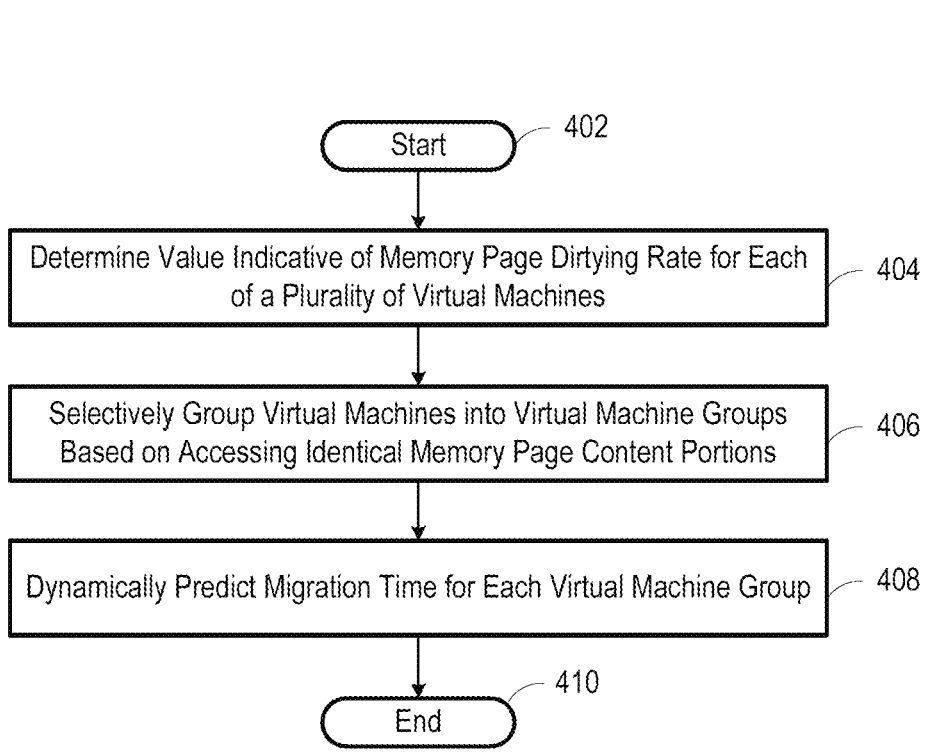
FIG. 4 is a high-level flow diagram of an illustrative live virtual machine migration method, in accordance with at least one embodiment of the present disclosure.

FIG. 4 is a high-level flow diagram of an illustrative live virtual machine migration method 400, in accordance with at least one embodiment of the present disclosure. In the method 400, the virtual machine migration controller 102 reduces the migration time and network bandwidth by selectively identifying and grouping virtual machines that have a high degree of memory page commonality. Such selective identification and grouping of virtual machines reduces the bandwidth and time required to complete the migration by minimizing or eliminating the transmission of redundant memory pages and/or the transmission of redundant memory page content between the source physical host and the destination physical host. By tracking the page dirtying time of the virtual machines included in each virtual machine group, the virtual machine migration controller 102 is able to determine a projected migration duration based on the page dirtying rate, the degree of commonality between memory pages mapped by each virtual machine, and network bandwidth. The method 400 commences at 402.

At 404, the virtual machine migration controller 102 determines a page dirtying rate for each of the virtual machines 120 slated for migration from a first physical host system 110 to a second physical host system 150. The page dirtying rate is the rate at which a virtual machine 120 changes, adds, or deletes information or data on one or more memory pages 124 mapped to the respective virtual machine. In embodiments, the page dirtying rate for a given virtual machine 120 may be relatively steady over time. Thus, the virtual machine migration controller 102 may determine a historical page dirtying rate for a particular virtual machine 120 over a defined time period, such as hourly. This data may then be used to predict the dirtying rate for each virtual machine and to determine the network bandwidth needed to transfer the memory pages 124 mapped to the respective virtual machine 120.

In embodiments, to track the memory working set dirtying rate, the virtual machine memory log-dirty mode in virtual machine migration process to track the dirty memory pages during a previous iteration of the virtual machine migration 140 may be used. The log-dirty mode sets write-protection to the virtual machine memory pages and sets a bitmap to indicate the dirty status of the memory page at the time of fault (e.g., virtual machine exit in system virtualization, or page fault in container virtual machine) when the virtual machine writes to the page.

At 406, the virtual machine migration controller 102 selectively groups virtual machines 120 into a number of virtual machine groups 210. The virtual machine migration controller 102 may group 210 the virtual machines 120 based at least in part on the presence of shared memory pages 124 among the constituent virtual machines 120 included in the group 210. The virtual machine migration controller 102 may group 210 the virtual machines 120 baser at least in part on each of the constituent virtual machines 120 mapping to a number of memory pages 124 that share at least a portion of the content contained on the memory page 124 with other memory pages 124 to which other virtual machines 120 included in the respective group 210 are mapped. The virtual machine migration controller 102 groups 210 virtual machines 120 based at least in part on the degree of commonality of memory page content shared by the virtual machines 120 included in the respective group. Increasing the degree of commonality of memory page content between virtual machines 120 included in a group 210 reduces the quantity of data migrated when the virtual machines 120 are live migrated 140, thereby beneficially reducing the time and bandwidth required to complete the migration.

At 408, the virtual machine migration controller 102 dynamically determines a projected migration time for each virtual machine group created at 406. The projected migration time may be influenced by factors such as: 1. The page dirtying rate of the virtual machines 120 included in the group 210 (higher memory page dirtying rates tend to increase migration time and bandwidth); 2. The degree of commonality of memory pages 124 between the virtual machines included in the group 210 (greater memory page commonality tends to decrease migration time and bandwidth); and 3. The available network bandwidth to perform the migration.

Based on the dirtying rate, the memory dirtying rate at a given network transfer speed may be predicted. In embodiments, the projected migration time for a given memory dirtying rate may be determined by first determining the amount of memory pages dirtied between a first time and a second time:

$$M = \int_{t1}^{t2} D(t) dt \tag{1}$$

Where: M=memory dirtied
D(t)=memory dirtying rate

The time required to transfer the memory dirtied at a given network speed is:

$$T = \frac{M}{s} \quad (2)$$

Where: T=time required to migrate
s=network speed

The next memory copy iteration will have memory dirtied as follows:

$$M = \int_0^T D(t)dt \quad (3)$$

The method 400 concludes at 410.

Figure 5:
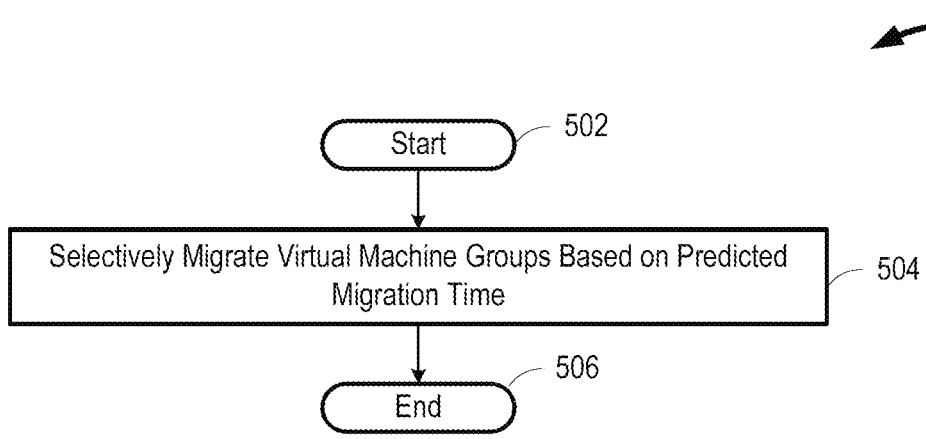
FIG. 5 is a high-level flow diagram of an illustrative method of migrating virtual machine groups between a first physical host and second physical host based on predicted migration time of the respective virtual machine groups, in accordance with at least one embodiment of the present disclosure.

FIG. 5 is a high-level flow diagram of an illustrative method 500 of migrating virtual machine groups 210 between a first physical host system 110 and second physical host system 150 based on a predicted migration time of the respective virtual machine groups, in accordance with at least one embodiment of the present disclosure. In at least some implementations, the virtual machine migration controller 102 may cause the migration of virtual machine groups based at least in part on the projected or estimated time to complete the migration based on a number of factors such as those described in detail with regard to 408 in FIG. 4. The method 500 commences at 502.

At 504, the virtual machine migration controller 102 selectively migrates virtual machine groups 210 based at least in part on the projected migration time calculated for each respective virtual machine group 210. In some implementations, the virtual machine migration controller 102 may migrate virtual machine groups 210 in an ascending order based on projected migration times (i.e., shortest migration time to longest migration time).

In embodiments, after the virtual machine migration controller 102 migrates the first virtual machine group 210, the virtual machine migration controller 102 may once again selectively group the remaining virtual machines 120 into a number of virtual machine groups 210. The virtual machine migration controller 102 may group 210 the remaining virtual machines 120 based at least in part on the presence of shared memory pages 124 among the constituent virtual machines 120 included in the group 210. After selectively grouping the remaining virtual machines 120 into a number of virtual machine groups 210, the virtual machine migration controller 102 may once again dynamically determine a projected migration time for each virtual machine group 210. After dynamically determining a projected migration time for each virtual machine group 210, the virtual machine migration controller 102 may once again selectively migrate a virtual machine group 210 based at least in part on the projected migration time calculated for each respective virtual machine group 210. The virtual machine migration controller 102 may iteratively perform this grouping, projected migration time, and migrate procedure until all of the virtual machines 120 have been migrated from the first physical host system 110 to the second physical host system 120. The method 500 concludes at 506.

Figure 6:
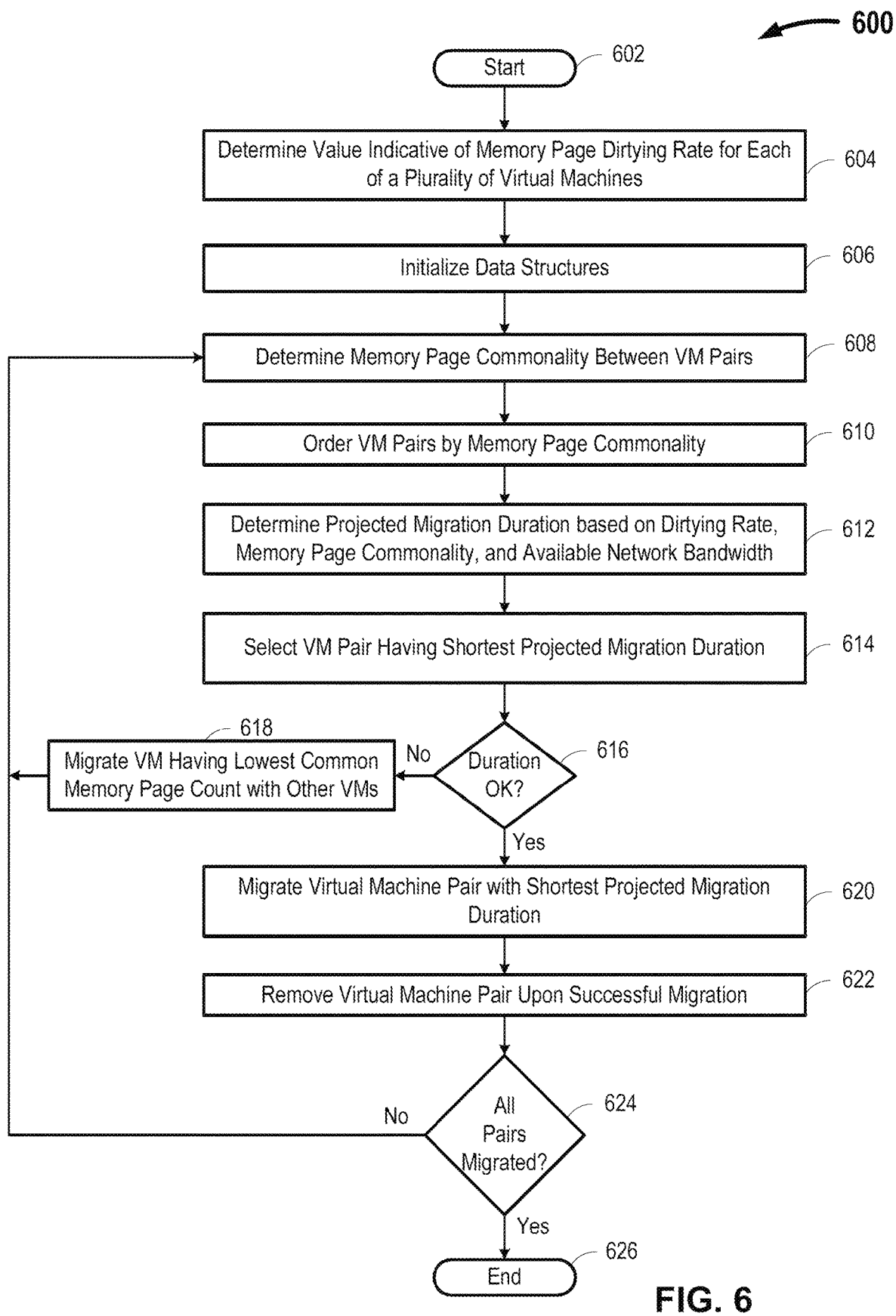
FIG. 6 is a high-level flow diagram of another illustrative live virtual machine migration method, in accordance with at least one embodiment of the present disclosure.

FIG. 6 is a high-level flow diagram of an illustrative live virtual machine migration method 600, in accordance with at least one embodiment of the present disclosure. In the method 600, the virtual machine migration controller 102 makes use of an iterative process in which virtual machines 120 are selectively apportioned into virtual machine pairs based at least in part on shared memory pages 124 and/or mapping to identical content on different memory pages 124. The virtual machine migration controller 102 determines a projected migration time for each of the virtual machine pairs. The virtual machine migration controller 102 determines the projected migration time based at least in part on the memory page dirtying rate for each of the virtual machines 120 included in the respective virtual machine pair, the quantity of shared memory pages and identical content between the virtual machines 120 included in the respective pair, and the available network bandwidth. The virtual machine migration controller 102 may order the virtual machine pairs based on the projected migration time and may migrate the virtual machine pair having the least projected migration time. After migrating the virtual machine pair having the least projected migration time, the virtual machine migration controller 102 may reapportion the remaining virtual machines 120 into new virtual machine pairs and repeat the migration process. The method 600 commences at 602.

At 604, the virtual machine migration controller 102 collects the memory working-set dirtying rate from each virtual machine 120 and determines a memory behavior pattern for each respective one of the virtual machines 120. In embodiments, the virtual machine migration controller 102 may use the historical dirtying rate of each of the virtual machines to predict the network bandwidth and/or migration time needed to migrate memory pages 124 mapped to the respective virtual machine 120 from the first physical host system 110 to the second physical host system 150.

At 606, the virtual machine migration controller 102 initializes data structures used to store memory page data, virtual machine group data, network bandwidth data, and similar data used during the virtual machine batch live migration.

At 608, the virtual machine migration controller 102 selectively groups virtual machines 120 into a number of virtual machine pairs to assess memory page commonality between each of the virtual machines 120. In embodiments, the virtual machine migration controller 102 may generate one or more values indicative of the degree of commonality of memory page content shared by the virtual machines 120. In embodiments, the virtual machine migration controller 102 may generate one or more data structures such as that depicted in FIG. 3 to assess the memory page commonality between various virtual machines 120.

At 610, the virtual machine migration controller 102 groups 210 virtual machines 120 into virtual machine pairs based at least in part on the degree of commonality of memory page content shared by the virtual machines 120. In embodiments the virtual machine migration controller 102 may order the virtual machine pairs 210 based upon the determined degree of commonality of memory page content shared by the virtual machines 120.

Increasing the degree of commonality of memory page content between virtual machines 120 included in a virtual machine pair 210 may reduce the quantity of data migrated when the virtual machine pair is live batch migrated 140, thereby beneficially reducing the time and bandwidth required to complete the migration.

At 612, the virtual machine migration controller 102 acquires from the network bandwidth allocator 114 data indicative of the given memory bandwidth between the first physical host system 110 and the second physical host system 150. In embodiments, the virtual machine migration controller 102 may iterate the virtual machine pairs 120 in the ordered list determined at 610 to select a virtual machine pair 210 that may be successfully migrated together based on the following criteria:

1. The page dirtying rate of the virtual machines 120 included in the pair (higher memory page dirtying rates tend to increase migration time and bandwidth);
2. The amount of total memory to transfer. In embodiments, the amount of memory transferred for a virtual machine pair 210 may be influenced by the degree of commonality of memory pages 124 between the virtual machines 120 included in the pair 210 (greater memory page commonality tends to decrease migration time and bandwidth); and
3. Opportunistic virtual machine batch migration. If the virtual machine migration controller 102 determines the virtual machine workload exhibits periodic fluctuations in memory dirtying rate, the virtual machine migration controller 102 may schedule the migration of the virtual machine pair 210 when the dirtying rate is approaching or at a minimum value.

Based on the dirtying rate, the virtual machine migration controller 102 may predict the projected migration time for each virtual machine pair at a given network transfer speed.

At 614, the virtual machine migration controller 102 selects the virtual machine pair having the shortest projected migration time.

At 616, the virtual machine migration controller 102 determines whether any of the virtual machine pairs 210 may be successfully migrated based at least in part on the analysis performed at 612. If the virtual machine migration controller 102 is unable to select a virtual machine pair 210 that meets all of the criteria, the method proceeds at 618. If the virtual machine migration controller 102 is able to select a virtual machine pair 210 that meets the criteria, the method proceeds at 620.

At 618, responsive to determining no virtual machine pair 210 may be successfully migrated, the virtual machine migration controller 102 selects the virtual machine 120 having the least amount of memory page commonality for migration from the first physical host device 110 to the second physical host device 150.

At 620, the virtual machine migration controller 102 migrates the virtual machine pair 210 having the shortest projected migration duration.

At 622, responsive to the successful migration of the virtual machine pair 210 having the shortest migration duration, the virtual machine migration controller 102 removes the virtual machine pair from the data set generated at 608.

At 624, the virtual machine migration controller 102 determines whether all of the virtual machines 120 have been migrated. If all virtual machines 120 have not been migrated, the method 600 returns to 608. If all virtual machines 120 have been migrated, the method 600 concludes at 626.

Figure 7:
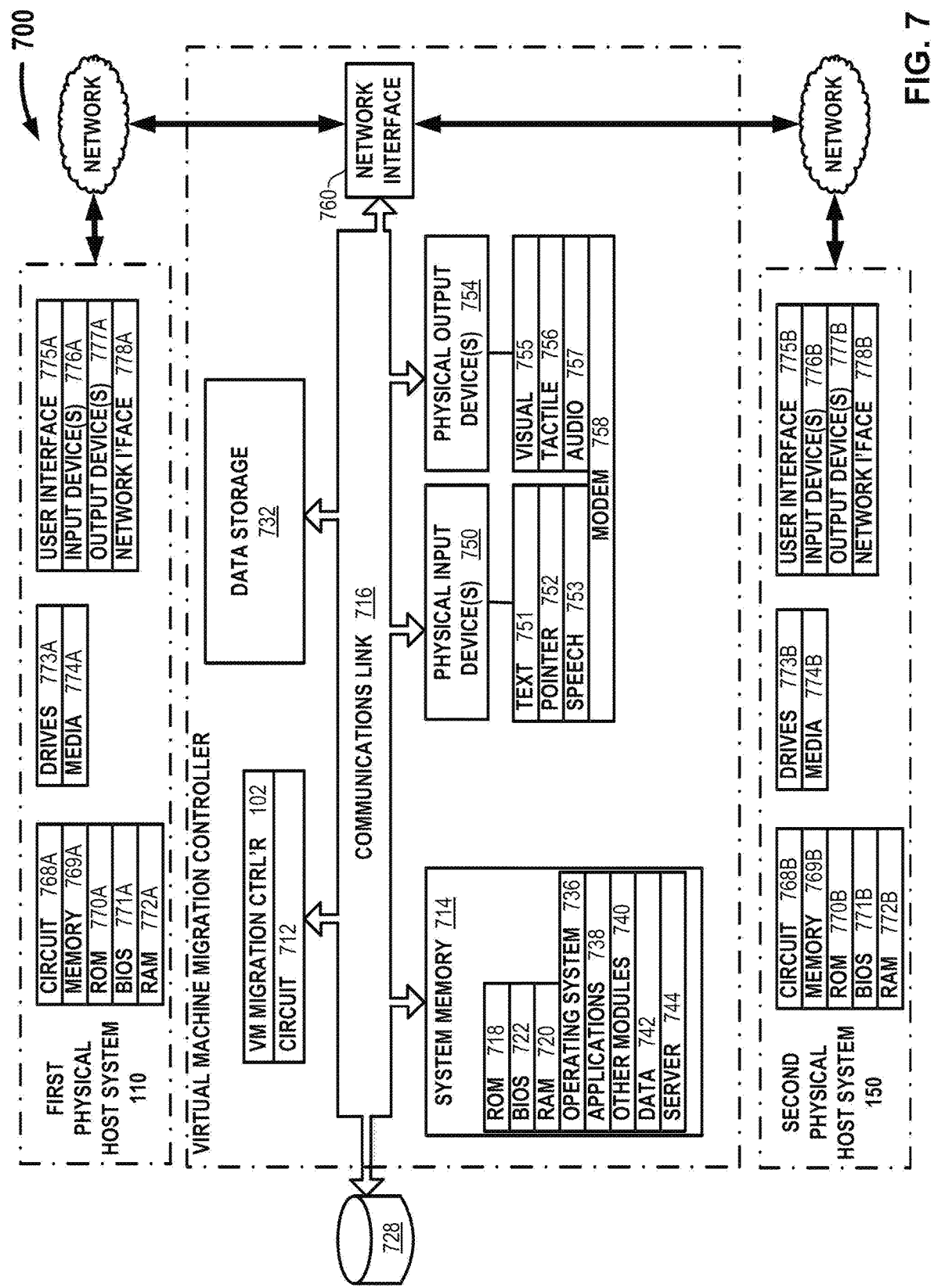
FIG. 7 is a block diagram of an illustrative virtual machine migration controller, in accordance with at least one embodiment of the present disclosure.

FIG. 7 and the following discussion provide a brief, general description of the components forming an illustrative virtual machine batch live migration system 700 that includes a virtual machine migration controller 102, a first physical host system 110, and a second physical host system 150 in which the various illustrated embodiments can be implemented. Although not required, some portion of the embodiments will be described in the general context of machine-readable or computer-executable instruction sets, such as program application modules, objects, or macros being executed by the virtual machine migration controller 102. Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The virtual machine migration controller 102 may take the form of one or more circuits including electronic and/or semiconductor components that are disposed partially or wholly in a PC, server, or other computing system capable of executing machine-readable instructions. The virtual machine migration controller 102 includes one or more circuits 712, and may, at times, include a communications link 716 that couples various system components including a system memory 714 to the one or more circuits 712. The virtual machine migration controller 102 will at times be referred to in the singular herein, but this is not intended to limit the embodiments to a single system, since in certain embodiments, there will be more than one virtual machine migration controller 102 or other networked circuits or devices involved.

The circuit 712 may include any number, type, or combination of devices. At times, the circuit 712 may be implemented in whole or in part in the form of semiconductor devices such as diodes, transistors, inductors, capacitors, and resistors. Such an implementation may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. Unless described otherwise, the construction and operation of the various blocks shown in FIG. 7 are of conventional design. As a result, such blocks need not be described in further detail herein, as they will be understood by those skilled in the relevant art. The communications link 716 that interconnects at least some of the components of the example virtual machine migration controller 102 may employ any known bus structures or architectures.

The system memory 714 may include read-only memory ("ROM") 718 and random access memory ("RAM") 720. A portion of the ROM 718 may contain a basic input/output system ("BIOS") 722. The BIOS 722 may provide basic functionality to the virtual machine migration controller 102, for example by causing the controller to load the machine-readable instruction sets that cause the one or more circuits 712 to provide and function as the virtual machine migration controller 102. The virtual machine migration controller 102 may include one or more communicably coupled, non-transitory, data storage devices 732. The one or more data storage devices 732 may include any current or future developed non-transitory storage devices. Non-limiting examples of such non-transitory, data storage devices 732 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 732 may include interfaces or controllers (not shown) communicatively coupling the respective storage device or system to the communications link 716, as is known by those skilled in the art. The one or more storage devices 732 may contain machine-readable instruction sets, data structures, program modules, and other data useful to the virtual machine migration controller 102. In some instances, one or more external storage devices 728 may be communicably coupled to the virtual machine migration controller 102, for example via one or more tethered or wireless networks.

Machine-readable instruction sets 738 and other instruction sets 740 may be stored in whole or in part in the system memory 714. Such instruction sets may be transferred from one or more storage devices 732 and/or one or more external storage devices 728 and stored in the system memory 714 in whole or in part when executed by the virtual machine migration controller 102. The machine-readable instruction sets 738 may include logic capable of providing the live virtual machine migration functions and capabilities described herein.

For example, one or more machine-readable instruction sets 738 may cause the virtual machine migration controller 102 to collect data representative of the memory working-set dirtying rate for each of a number of virtual machines 120 hosted on a first physical host system 110. One or more machine-readable instruction sets 738 may cause the virtual machine migration controller 102 to analyze the collected data representative of the memory working-set dirtying rate for each of a number of virtual machines 120 to determine a memory dirtying rate and/or a memory dirtying rate pattern for each of the virtual machines 120.

One or more machine-readable instruction sets 738 may cause the virtual machine migration controller 102 to generate data or information indicative of memory pages 124 shared by a plurality of virtual machines 120. One or more machine-readable instruction sets 738 may cause the virtual machine migration controller 102 to generate at least one of data or information indicative of identical portions of memory pages 124 mapped to different virtual machines 120. One or more machine-readable instruction sets 738 may cause the virtual machine migration controller 102 to generate one or more logical structures, such as the table depicted in FIG. 3, indicative of memory page 124 commonality among a plurality of different virtual machines 120.

One or more machine-readable instruction sets 738 may cause the virtual machine migration controller 102 to collect data representative of the available bandwidth to live transfer a plurality of virtual machines 120 from a first physical host system 110 to a second physical host system 150. One or more machine-readable instruction sets 738 may cause the virtual machine migration controller 102 to iterate the virtual machine groups or pairs 210 to select the virtual machine group or pair 210 for migration.

One or more machine-readable instruction sets 738 may cause the virtual machine migration controller 102 to predict migration times for virtual machine groups or pairs 210 based at least in part on the dirtying rate for each virtual machine 120, the memory pages shared between the virtual machines 120 in a group or pair 210, and the available network bandwidth.

Users of the virtual machine migration controller 102 may provide, enter, or otherwise supply commands (e.g., acknowledgements, selections, confirmations, and similar) as well as information (e.g., subject identification information, color parameters) to the virtual machine migration controller 102 using one or more communicably coupled physical input devices 750 such as one or more text entry devices 751 (e.g., keyboard), one or more pointing devices 752 (e.g., mouse, trackball, touchscreen), and/or one or more audio input devices 753. Some or all of the physical input devices 750 may be physically and communicably coupled to the virtual machine migration controller 102. For example, an example virtual machine migration controller 102 may include a touchscreen user interface that provides a number of physical input devices 750, such as a touchscreen 751.

Users of the virtual machine migration controller 102 may generate output via one or more physical output devices 754. In at least some implementations, the physical output devices 754 may include, but are not limited to, one or more display devices 755; one or more tactile output devices 756; one or more audio output devices 757, or any combination thereof. Some or all of the physical input devices 750 and some or all of the physical output devices 754 may be communicably coupled to the virtual machine migration controller 102 via one or more wired or wireless interfaces.

For convenience, the network interface 760, the one or more circuits 712, the system memory 714, the physical input devices 750 and the physical output devices 754 are illustrated as communicatively coupled to each other via the communications link 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In some embodiments, communications link 716 is omitted and the components are coupled directly to each other using suitable wired or wireless connections.

The first physical host device 110 may include one or more circuits 768A capable of executing one or more machine-readable instruction sets. At times, some or all of the machine-readable instruction sets may be stored or otherwise retained in a system memory 769A within the first physical host device 110. The system memory 769A may include read only memory (ROM) 770A, random access memory 772A, or combinations thereof. The first physical host device BIOS 771A may be stored, retained, or otherwise occupy at least a portion of the ROM 770A.

The first physical host device 110 may also include one or more storage devices 773A. At times, the one or more storage devices 773A may include, but are not limited to, a solid-state storage device, a rotating media storage device, an electrostatic storage device, an electroresistive storage device or combinations thereof that are disposed in whole or in part in the first physical host device 110. At times, the first physical host device 110 may include a cloud-based rack-mounted server computer system. At times, the one or more storage devices 773A may include one or more types of removable media 774A, for example one or more hot-swappable hard drives or similar storage appliances.

The first physical host device 110 may also include one or more user interfaces 775A. The one or more user interfaces 775A may include one or more user input devices 776A. Example, non-limiting user input devices 776A may include, but are not limited to, one or more pointers, one or more text input devices, one or more audio input devices, one or more touchscreen input devices, or combinations thereof. The one or more user interfaces 775A may alternatively or additionally include one or more user output devices 777A. Example, non-limiting user output devices 777A may include, but are not limited to, one or more visual output devices, one or more tactile output devices, one or more audio output devices, or combinations thereof.

The first physical host system 110 may include one or more network interfaces 778A. The one or more network interfaces 778A may include any current or future tethered interface (e.g., backplane, Ethernet, and similar) or wireless network interface (e.g., WiFi, IEEE 802.11). The one or more network interfaces 778A may, on occasion, communicably couple the first physical host system 110 to the virtual machine migration controller 102.

The one or more circuits 768A may include one or more single- or multi-core processor(s) or microprocessor(s) adapted to execute one or more machine-readable instruction sets. The one or more circuits 768A may include one or more microprocessors, reduced instruction set computers (RISCs), application specific integrated circuits (ASICs), digital signal processors (DSPs), systems on a chip (SoCs) or similar.

The system memory 769A may store all or a portion of a basic input/output system (BIOS), boot sequence, firmware, startup routine, or similar. The system memory 769A may store all or a portion of the virtual machine migration controller 102 operating system (e.g., iOS®, Android®, Windows® Phone, Windows® 10, and similar) that is executed by the one or more circuits 768A upon initial powering.

The second physical host device 150 may include one or more circuits 768B capable of executing one or more machine-readable instruction sets. At times, some or all of the machine-readable instruction sets may be stored or otherwise retained in a system memory 769B within the second physical host device 150. The system memory 769B may include read only memory (ROM) 770B, random access memory 772B, or combinations thereof. The second physical host device BIOS 771B may be stored, retained, or otherwise occupy at least a portion of the ROM 770B.

The second physical host device 150 may also include one or more storage devices 773B. At times, the one or more storage devices 773B may include, but are not limited to, a solid-state storage device, a rotating media storage device, an electrostatic storage device, an electroresistive storage device or combinations thereof that are disposed in whole or in part in the second physical host device 150. At times, the second physical host device 150 may include a cloud-based rack-mounted server computer system. At times, the one or more storage devices 773B may include one or more types of removable media 774B, for example one or more hot-swappable hard drives or similar storage appliances.

The second physical host device 150 may also include one or more user interfaces 775B. The one or more user interfaces 775B may include one or more user input devices 776B. Example, non-limiting user input devices 776B may include, but are not limited to, one or more pointers, one or more text input devices, one or more audio input devices, one or more touchscreen input devices, or combinations thereof. The one or more user interfaces 775B may alternatively or additionally include one or more user output devices 777B. Example, non-limiting user output devices 777B may include, but are not limited to, one or more visual output devices, one or more tactile output devices, one or more audio output devices, or combinations thereof.

The second physical host device 150 may include one or more network interfaces 778B. The one or more network interfaces 778B may include any current or future tethered interface (e.g., backplane, Ethernet, and similar) or wireless network interface (e.g., WiFi, IEEE 802.11). The one or more network interfaces 778B may, on occasion, communicably couple the second physical host device 150 to the virtual machine migration controller 102.

The one or more circuits 768B may include one or more single- or multi-core processor(s) or microprocessor(s) adapted to execute one or more machine-readable instruction sets. The one or more circuits 768B may include one or more microprocessors, reduced instruction set computers (RISCs), application specific integrated circuits (ASICs), digital signal processors (DSPs), systems on a chip (SoCs) or similar.

The system memory 769B may store all or a portion of a basic input/output system (BIOS), boot sequence, firmware, startup routine, or similar. The system memory 769B may store all or a portion of the virtual machine migration controller 102 operating system (e.g., iOS®, Android®, Windows® Phone, Windows® 10, and similar) that is executed by the one or more circuits 768B upon initial powering.

The following examples pertain to further embodiments. The following examples of the present disclosure may comprise subject material such as devices, systems, and methods that facilitate the live migration of a plurality of virtual machines 120 from a first physical host system 110 to a second physical host system 150.

According to example 1, there is provided a system to live migrate a plurality of virtual machines from a first physical host to a second physical host, the system. The system may include at least one network interface communicably coupled to the first physical host and to the second physical host, and at least one circuit communicably coupled to the at least one network interface. The system may further include at least one storage device communicably coupled to the at least one circuit, the at least one storage device including machine-readable instructions that, when executed, cause at least a portion of the circuit to provide a virtual machine migration controller, the virtual machine migration controller to: for each virtual machine in a plurality of virtual machines hosted on the first physical host: determine a value indicative of the memory page dirtying rate logically associated with the respective virtual machine, selectively group at least some of the virtual machines in the plurality of virtual machines to provide a number of virtual machine groups, each virtual machine in a respective virtual machine group accessing an identical memory page content portion on the first physical host and dynamically predict a duration to migrate the respective virtual machine group based at least in part on: a single migration of the identical memory page content portion accessed by the virtual machines in the respective virtual machine group; an available bandwidth to migrate the respective virtual machine group from the first physical host to the second physical host; and the value indicative of the memory page dirtying rate logically associated with each of the virtual machines included in the respective virtual machine group.

Example 2 may include elements of example 1 where the machine-readable instructions may further cause the virtual machine migration controller to: selectively migrate each of the number of virtual machine groups from the first physical host to the second physical host, the virtual machine group migration performed in an order based at least in part on the predicted duration to migrate the respective virtual machine group at the available bandwidth.

Example 3 may include elements of example 1 where the machine-readable instructions that cause the virtual machine migration controller to determine a value indicative of the memory page dirtying rate logically associated with the respective virtual machine, may cause the virtual machine migration controller to: determine a value indicative of the memory page dirtying rate for each respective virtual machine over a defined historical temporal interval.

Example 4 may include elements of example 3 where the machine-readable instructions that cause the virtual machine migration controller to determine a value indicative of the memory page dirtying rate for each respective virtual machine over a defined historical temporal interval, causes the virtual machine migration controller to: determining a historical value indicative of the memory page dirtying rate for each respective virtual machine over a 60 minute interval.

Example 5 may include elements of example 1 where the machine-readable instructions that cause the virtual machine migration controller to selectively group virtual machines in the plurality of virtual machines, may cause the virtual machine migration controller to selectively pair virtual machines in the plurality of virtual machines to provide a number of virtual machine pairs, each virtual machine in a respective virtual machine pair accessing at least one identical memory page content portion.

Example 6 may include elements of example 1 where the machine-readable instructions that cause the virtual machine migration controller to selectively group virtual machines in the plurality of virtual machines, may cause the virtual machine migration controller to: selectively group virtual machines such that each virtual machine in a respective virtual machine group accesses at least one common memory page.

Example 7 may include elements of example 1 where the machine-readable instructions that cause the virtual machine migration controller to selectively group virtual machines in the plurality of virtual machines, may cause the virtual machine migration controller to: selectively group at least some of the virtual machines such that each virtual machine in a respective virtual machine group accesses at least one of a plurality of memory pages, each of the plurality of memory pages including, at least in part, identical content.

Example 8 may include elements of example 7 where the machine-readable instructions that cause the virtual machine migration controller to selectively group at least some of the virtual machines such that each virtual machine in a respective virtual machine group accesses at least one of a plurality of memory pages, each of the plurality of memory pages including, at least in part, identical content, may cause the virtual machine migration controller to: determine a hash value based at least in part on the content included in at least a portion of each of the plurality of memory pages; detect the at least two memory pages within the plurality of memory pages having similar hash values; and identify the identical content included on each of the at least two pages for the detected at least two memory pages within the plurality of memory pages having similar hash values.

Example 9 may include elements of example 1 where the machine-readable instructions that cause the virtual machine migration controller to selectively group at least some of the virtual machines in the plurality of virtual machines, may cause the virtual machine migration controller to selectively group at least some of the virtual machines such that each virtual machine in a respective virtual machine group accesses at least one of a plurality of memory pages, each of the plurality of memory pages including, at least in part, identical content.

Example 10 may include elements of example 9 where the machine-readable instructions that cause the virtual machine migration controller to selectively group at least some of the virtual machines such that each virtual machine in a respective virtual machine group accesses at least one of a plurality of memory pages, each of the plurality of memory pages including, at least in part, identical content, may cause the virtual machine migration controller to: determine a fingerprint value based at least in part on the content included in at least a portion of each of the plurality of memory pages; compare fingerprint values to identify the at least two candidate identical memory pages in the plurality of memory pages; compare, byte-by-byte, each of the at least two candidate identical memory pages; and identify the at least two memory pages having identical content within a plurality of memory pages based at least in part on the byte-by-byte comparison.

According to example 11 there is provided a live virtual machine migration system. The system may include at least one controller circuit and at least one storage device communicably coupled to the at least one controller circuit, the at least one storage device including machine-executable instructions that, when executed by the at least one controller circuit, cause the at least one controller circuit to provide a virtual machine migration controller. The virtual machine migration controller may determine a page dirtying rate for each of a plurality of virtual machines resident on a first host system; selectively group at least some of the plurality of virtual machines to form a number of virtual machine groups, each of the virtual machine groups including virtual machines that previously accessed at least one identical memory page content portion; and determine a projected migration time to migrate each of the number of virtual machine groups from the first host system to a second host system based at least in part on the at least one identical memory page content portion, the page dirtying rate for each of the virtual machines included in the respective group, and available network bandwidth.

Example 12 may include elements of example 11 where the machine-executable instructions may further cause the virtual machine migration controller to determine a migration order for each of the number of virtual machine groups by the virtual machine migration controller.

Example 13 may include elements of example 12 where the machine-executable instructions that cause the virtual machine migration controller to determine a migration order for each of the number of virtual machine groups, may further cause the virtual machine migration controller to determine a migration order for each of the number of virtual machine groups based at least in part on the projected migration time for each respective one of the number of virtual machine groups.

Example 14 may include elements of example 12 where the machine-executable instructions may further cause the virtual machine migration controller to selectively migrate each of the number of virtual machine groups from the first host system to the second host system in an order based at least in part on the predicted duration to migrate the respective virtual machine group at the available bandwidth.

Example 15 may include elements of example 11 where the machine-executable instructions that cause the virtual machine migration controller to determine a page dirtying rate for each of a plurality of virtual machines, may further cause the virtual machine migration controller to determine a page dirtying rate for each of the virtual machines based on historical page dirtying by each respective one of the virtual machines over a defined time interval.

Example 16 may include elements of example 11 where the machine-executable instructions that cause the virtual machine migration controller to selectively group at least some of the plurality of virtual machines to form a number of virtual machine groups, may further cause the virtual machine migration controller to selectively group each of the plurality of virtual machines into one of a number of virtual machine pairs, each virtual machine in a respective virtual machine pair accessing at least one identical memory page content portion.

Example 17 may include elements or any of examples 11 through 16 where the machine-executable instructions that cause the virtual machine migration controller to selectively group at least some of the plurality of virtual machines to form a number of virtual machine groups, may further cause the virtual machine migration controller to selectively group at least some of the plurality of virtual machines to form a number of virtual machine groups, each of the virtual machine groups including virtual machines that previously accessed at least one common memory page.

Example 18 may include elements of any of examples 11 through 16 where the machine-executable instructions that cause the virtual machine migration controller to selectively group at least some of the plurality of virtual machines to form a number of virtual machine groups, may further cause the virtual machine migration controller to selectively group at least some of the plurality of virtual machines to form a number of virtual machine groups, each of the virtual machine groups including virtual machines that previously accessed at least one of a plurality of memory pages, each of the plurality of memory pages including at least in part the identical memory page content portion.

Example 19 may include elements of example 18 where the machine-executable instructions that cause the virtual machine migration controller to selectively group at least some of the plurality of virtual machines to form a number of virtual machine groups, may further cause the virtual machine migration controller to: determine a hash value based at least in part on the content included in at least a portion of each of the plurality of memory pages; detect the at least two memory pages within the plurality of memory pages having similar hash values; and identify the identical content included on each of the at least two pages for the detected at least two memory pages within the plurality of memory pages having similar hash values.

Example 20 may include elements of any of examples 11 through 16 where wherein the machine-executable instructions that cause the virtual machine migration controller to selectively group at least some of the plurality of virtual machines to form a number of virtual machine groups, may further cause the virtual machine migration controller to selectively group at least some of the plurality of virtual machines to form a number of virtual machine groups, each of the virtual machine groups including virtual machines that previously accessed at least one of a plurality of memory pages, each of the plurality of memory pages having identical memory page content.

Example 21 may include elements of example 20 where the machine-executable instructions that cause the virtual machine migration controller to selectively group at least some of the plurality of virtual machines to form a number of virtual machine groups, may further cause the virtual machine migration controller to determine a hash value based at least in part on the content included in at least a portion of each of the plurality of memory pages; detect the at least two memory pages within the plurality of memory pages having similar hash values; and identify the identical content included on each of the at least two pages for the detected at least two memory pages within the plurality of memory pages having similar hash values.

According to example 22, there is provided a live virtual machine migration method.

The method may include, for each virtual machine in a plurality of virtual machines, determining a value indicative of the memory page dirtying rate logically associated with the respective virtual machine and selectively grouping virtual machines in the plurality of virtual machines to provide a number of virtual machine groups, each virtual machine in a respective virtual machine group accessing an identical memory page content portion. The method may further include, for each virtual machine group, dynamically predicting a duration to migrate the respective virtual machine group based at least in part on: a single migration of the identical memory page content portion accessed by the virtual machines in the respective virtual machine group; an available bandwidth to migrate the respective virtual machine group; and the value indicative of the memory page dirtying rate logically associated with each of the virtual machines included in the respective virtual machine group.

Example 23 may include elements of example 22 and the method may additionally include selectively migrating each of the number of virtual machine groups in an order based at least in part on the predicted duration to migrate the respective virtual machine group at the available bandwidth.

Example 24 may include elements of example 22 where determining a value indicative of the memory page dirtying rate logically associated with the respective virtual machine may include determining a value indicative of the memory page dirtying rate for each respective virtual machine over a defined historical temporal interval.

Example 25 may include elements of example 24 where determining a value indicative of the memory page dirtying rate for each respective virtual machine over a defined historical temporal interval may include determining a historical value indicative of the memory page dirtying rate for each respective virtual machine over a 60 minute interval.

Example 26 may include elements of example 22 where selectively grouping virtual machines in the plurality of virtual machines to provide a number of virtual machine groups, each virtual machine in a respective virtual machine group accessing at least one identical memory page content portion may include selectively pairing virtual machines in the plurality of virtual machines to provide a number of virtual machine pairs, each virtual machine in a respective virtual machine pair may access at least one identical memory page content portion.

Example 27 may include elements of example 22 where selectively grouping virtual machines in the plurality of virtual machines to provide a number of virtual machine groups, each virtual machine in a respective virtual machine group accessing at least one identical memory page content portion may include selectively grouping virtual machines such that each virtual machine in a respective virtual machine group accesses at least one common memory page.

Example 28 may include elements of example 22 where selectively grouping virtual machines in the plurality of virtual machines to provide a number of virtual machine groups, each virtual machine in a respective virtual machine group accessing at least one identical memory page content portion may include selectively grouping virtual machines such that each virtual machine in a respective virtual machine group accesses at least one of a plurality of memory pages having identical memory page content.

Example 29 may include elements of example 28 where selectively grouping virtual machines such that each virtual machine in a respective virtual machine group accesses at least one of a plurality of memory pages having identical memory page content may include determining a hash value based at least in part on the content included in at least a portion of each of the plurality of memory pages; detecting the at least two memory pages within the plurality of memory pages having similar hash values; and identifying the identical content included on each of the at least two pages for the detected at least two memory pages within the plurality of memory pages having similar hash values.

Example 30 may include elements of example 22 where selectively grouping virtual machines in the plurality of virtual machines to provide a number of virtual machine groups, each virtual machine in a respective virtual machine group accessing at least one identical memory page content portion may include selectively grouping virtual machines such that each virtual machine in a respective virtual machine group accesses at least one of a plurality of memory pages, each of the plurality of memory pages may include, at least in part, identical content.

Example 31 may include elements of example 30 where selectively grouping virtual machines such that each virtual machine in a respective virtual machine group accesses at least one of a plurality of memory pages, each of the plurality of memory pages including, at least in part, identical content may include determining a fingerprint value based at least in part on the content included in at least a portion of each of the plurality of memory pages; comparing fingerprint values to identify the at least two candidate identical memory pages in the plurality of memory pages; comparing, byte-by-byte, each of the at least two candidate identical memory pages; and identifying the at least two memory pages having identical content within a plurality of memory pages based at least in part on the byte-by-byte comparison.

According to example 32, there is provided a live virtual machine migration method. The method may include determining, by a virtual machine migration controller, a page dirtying rate for each of a plurality of virtual machines. The method may further include selectively grouping, by the virtual machine migration controller, at least some of the plurality of virtual machines to form a number of virtual machine groups, each of the virtual machine groups including virtual machines that previously accessed at least one identical memory page content portion. The method may additionally include determining, by the virtual machine migration controller a projected migration time for each of the number of virtual machine groups based at least in part on the at least one identical memory page content portion, the page dirtying rate for each of the virtual machines included in the respective group, and available network bandwidth.

Example 33 may include elements of example 32 and the method may additionally include determining a migration order for each of the number of virtual machine groups by the virtual machine migration controller.

Example 34 may include elements of example 33 where determining a migration order for each of the number of virtual machine groups may include determining, by the virtual machine migration controller, a migration order for each of the number of virtual machine groups based at least in part on the projected migration time for each respective one of the number of virtual machine groups.

Example 35 may include elements of example 33 where determining a page dirtying rate for each of a plurality of virtual machines may include determining, by the virtual machine migration controller, a page dirtying rate for each of the virtual machines based on historical page dirtying by each respective one of the virtual machines over a defined time interval.

Example 36 may include elements of example 32 where selectively grouping at least some of the plurality of virtual machines to form a number of virtual machine groups may include selectively grouping, by the virtual machine migration controller, each of the plurality of virtual machines into one of a number of virtual machine pairs, each virtual machine in a respective virtual machine pair accessing at least one identical memory page content portion.

Example 37 may include elements of any of examples 32 through 36 where selectively grouping at least some of the plurality of virtual machines to form a number of virtual machine groups may include selectively grouping, by the virtual machine migration controller, at least some of the plurality of virtual machines to form a number of virtual machine groups, each of the virtual machine groups including virtual machines that previously accessed at least one common memory page.

Example 38 may include elements of any of examples 32 through 36 where selectively grouping at least some of the plurality of virtual machines to form a number of virtual machine groups may include selectively grouping, by the virtual machine migration controller, at least some of the plurality of virtual machines to form a number of virtual machine groups, each of the virtual machine groups including virtual machines that previously accessed at least one of a plurality of memory pages, each of the plurality of memory pages including at least in part the identical memory page content portion.

Example 39 may include elements of example 38 where selectively grouping at least some of the plurality of virtual machines to form a number of virtual machine groups may include determining a hash value based at least in part on the content included in at least a portion of each of the plurality of memory pages; detecting the at least two memory pages within the plurality of memory pages having similar hash values; and identifying the identical content included on each of the at least two pages for the detected at least two memory pages within the plurality of memory pages having similar hash values.

Example 40 may include elements of any of example 32 through 36 where selectively grouping at least some of the plurality of virtual machines to form a number of virtual machine groups may include selectively grouping, by the virtual machine migration controller, at least some of the plurality of virtual machines to form a number of virtual machine groups, each of the virtual machine groups including virtual machines that previously accessed at least one of a plurality of memory pages, each of the plurality of memory pages having identical memory page content.

Example 41 may include elements of example 40 where selectively grouping at least some of the plurality of virtual machines to form a number of virtual machine groups may include determining a hash value based at least in part on the content included in at least a portion of each of the plurality of memory pages; detecting the at least two memory pages within the plurality of memory pages having similar hash values; and identifying the identical content included on each of the at least two pages for the detected at least two memory pages within the plurality of memory pages having similar hash values.

According to example 42, there is provided a live virtual machine migration system. The system may include, for each virtual machine in a plurality of virtual machines, a means for determining a value indicative of the memory page dirtying rate logically associated with the respective virtual machine. The system may additionally include a means for selectively grouping virtual machines in the plurality of virtual machines to provide a number of virtual machine groups, each virtual machine in a respective virtual machine group accessing an identical memory page content portion. The system may additionally include, for each virtual machine group, a means for dynamically predicting a duration to migrate the respective virtual machine group based at least in part on: a single migration of the identical memory page content portion accessed by the virtual machines in the respective virtual machine group; an available bandwidth to migrate the respective virtual machine group; and the value indicative of the memory page dirtying rate logically associated with each of the virtual machines included in the respective virtual machine group.

Example 43 may include elements of example 42 and the system may additionally include a means for selectively migrating each of the number of virtual machine groups in an order based at least in part on the predicted duration to migrate the respective virtual machine group at the available bandwidth.

Example 44 may include elements of example 42 where the means for determining a value indicative of the memory page dirtying rate logically associated with the respective virtual machine may include a means for determining a value indicative of the memory page dirtying rate for each respective virtual machine over a defined historical temporal interval.

Example 45 may include elements of example 44 where the means for determining a value indicative of the memory page dirtying rate for each respective virtual machine over a defined historical temporal interval may include a means for determining a historical value indicative of the memory page dirtying rate for each respective virtual machine over a 60 minute interval.

Example 46 may include elements of example 42 where the means for selectively grouping virtual machines in the plurality of virtual machines may include a means for selectively pairing virtual machines in the plurality of virtual machines to provide a number of virtual machine pairs, each virtual machine in a respective virtual machine pair accessing at least one identical memory page content portion.

Example 47 may include elements of example 42 where the means for selectively grouping virtual machines in the plurality of virtual machines may include a means for selectively grouping virtual machines such that each virtual machine in a respective virtual machine group accesses at least one common memory page.

Example 48 may include elements of example 42 where the means for selectively grouping virtual machines in the plurality of virtual machines may include a means for selectively grouping virtual machines such that each virtual machine in a respective virtual machine group accesses at least one of a plurality of memory pages, each of the plurality of memory pages including, at least in part, identical content.

Example 49 may include elements of example 48 where the means for selectively grouping virtual machines such that each virtual machine in a respective virtual machine group accesses at least one of a plurality of memory pages, each of the plurality of memory pages including, at least in part, identical content may include a means for determining a hash value based at least in part on the content included in at least a portion of each of the plurality of memory pages; a means for detecting the at least two memory pages within the plurality of memory pages having similar hash values; and a means for identifying the identical content included on each of the at least two pages for the detected at least two memory pages within the plurality of memory pages having similar hash values.

Example 50 may include elements of example 48 where the means for selectively grouping virtual machines in the plurality of virtual machines may include a means for selectively grouping virtual machines such that each virtual machine in a respective virtual machine group accesses at least one of a plurality of memory pages having identical memory page content.

Example 51 may include elements of example 50 where the means for selectively grouping virtual machines such that each virtual machine in a respective virtual machine group accesses at least one of a plurality of memory pages having identical memory page content may include a means for determining a fingerprint value based at least in part on the content included in at least a portion of each of the plurality of memory pages; a means for comparing fingerprint values to identify the at least two candidate identical memory pages in the plurality of memory pages; a means for comparing, byte-by-byte, each of the at least two candidate identical memory pages; and a means for identifying the at least two memory pages having identical content within a plurality of memory pages based at least in part on the byte-by-byte comparison.

According to example 52, there is provided a live virtual machine migration system. The system may include a means for determining a page dirtying rate for each of a plurality of virtual machines implemented on a first hosting system. The system may further include a means for selectively grouping at least some of the plurality of virtual machines to form a number of virtual machine groups, each of the virtual machine groups including virtual machines that previously accessed at least one identical memory page content portion. The system may additionally include a means for determining a projected migration time for each of the number of virtual machine groups based at least in part on the at least one identical memory page content portion, the page dirtying rate for each of the virtual machines included in the respective group, and available network bandwidth.

Example 53 may include elements of example 52 and the system may additionally include a means for determining a migration order for each of the number of virtual machine groups by the virtual machine migration controller.

Example 54 may include elements of example 53 where the means for determining a migration order for each of the number of virtual machine groups may include a means for determining a migration order for each of the number of virtual machine groups based at least in part on the projected migration time for each respective one of the number of virtual machine groups.

Example 55 may include elements of example 53 where the means for determining a page dirtying rate for each of a plurality of virtual machines may include a means for determining a page dirtying rate for each of the virtual machines based on historical page dirtying by each respective one of the virtual machines over a defined time interval.

Example 56 may include elements of example 52 where the means for selectively grouping at least some of the plurality of virtual machines to form a number of virtual machine groups may include a means for selectively grouping each of the plurality of virtual machines into one of a number of virtual machine pairs, each virtual machine in a respective virtual machine pair accessing at least one identical memory page content portion.

Example 57 may include elements of any of claims 52 through 56 where the means for selectively grouping at least some of the plurality of virtual machines to form a number of virtual machine groups may include a means for selectively grouping, by the virtual machine migration controller, at least some of the plurality of virtual machines to form a number of virtual machine groups, each of the virtual machine groups including virtual machines that previously accessed at least one common memory page.

Example 58 may include elements of any of claims 52 through 56 where the means for selectively grouping at least some of the plurality of virtual machines to form a number of virtual machine groups may include a means for selectively grouping, by the virtual machine migration controller, at least some of the plurality of virtual machines to form a number of virtual machine groups, each of the virtual machine groups including virtual machines that previously accessed at least one of a plurality of memory pages, each of the plurality of memory pages including at least in part the identical memory page content portion.

Example 59 may include elements of example 58 where the means for selectively grouping at least some of the plurality of virtual machines to form a number of virtual machine groups may include a means for determining a hash value based at least in part on the content included in at least a portion of each of the plurality of memory pages; a means for detecting the at least two memory pages within the plurality of memory pages having similar hash values; and a means for identifying the identical content included on each of the at least two pages for the detected at least two memory pages within the plurality of memory pages having similar hash values.

Example 60 may include elements of examples 52 through 56 where the means for selectively grouping at least some of the plurality of virtual machines to form a number of virtual machine groups may include selectively grouping, by the virtual machine migration controller, at least some of the plurality of virtual machines to form a number of virtual machine groups, each of the virtual machine groups including virtual machines that previously accessed at least one of a plurality of memory pages, each of the plurality of memory pages having identical memory page content.

Example 61 may include elements of example 60 where selectively grouping at least some of the plurality of virtual machines to form a number of virtual machine groups may include a means for determining a hash value based at least in part on the content included in at least a portion of each of the plurality of memory pages; a means for detecting the at least two memory pages within the plurality of memory pages having similar hash values; and a means for identifying the identical content included on each of the at least two pages for the detected at least two memory pages within the plurality of memory pages having similar hash values.

According to example 62, there is provided a storage device that includes machine readable instructions that, when executed by a circuit, cause the circuit to provide a virtual machine migration controller. The virtual machine controller may determine a page dirtying rate for each of a plurality of virtual machines, selectively group at least some of the plurality of virtual machines to form a number of virtual machine groups, each of the virtual machine groups including virtual machines that previously accessed at least one identical memory page content portion, and determine a projected migration time for each of the number of virtual machine groups based at least in part on the at least one identical memory page content portion, the page dirtying rate for each of the virtual machines included in the respective group, and available network bandwidth.

Example 63 may include elements of example 62, and may additionally include machine readable instructions that, when executed by the virtual machine migration controller, may cause the virtual machine migration controller to determine a migration order for each of the number of virtual machine groups.

Example 64 may include elements of example 63 where the machine-readable instructions that cause the virtual machine migration controller to determine a migration order for each of the number of virtual machine groups may further cause the virtual machine migration controller to determine a migration order for each of the number of virtual machine groups based at least in part on the projected migration time for each respective one of the number of virtual machine groups.

Example 65 may include elements of example 63 where the machine-readable instructions that cause the virtual machine migration controller to determine a page dirtying rate for each of a plurality of virtual machines may further cause the virtual machine migration controller to determine a page dirtying rate for each of the virtual machines based on historical page dirtying by each respective one of the virtual machines over a defined time interval.

Example 66 may include elements of example 62 where the machine-readable instructions that cause the virtual machine migration controller to selectively group at least some of the plurality of virtual machines to form a number of virtual machine groups may further cause the virtual machine migration controller to selectively group each of the plurality of virtual machines into one of a number of virtual machine pairs, each virtual machine in a respective virtual machine pair accessing at least one identical memory page content portion.

Example 67 may include elements of any of examples 62 through 66 where the machine-readable instructions that cause the virtual machine migration controller to selectively group at least some of the plurality of virtual machines to form a number of virtual machine groups may further cause the virtual machine migration controller to selectively group at least some of the plurality of virtual machines to form a number of virtual machine groups, each of the virtual machine groups including virtual machines that previously accessed at least one common memory page.

Example 68 may include elements of any of claims 62 through 68 where the machine-readable instructions that cause the virtual machine migration controller to selectively group at least some of the plurality of virtual machines to form a number of virtual machine groups may further cause the virtual machine migration controller to selectively group at least some of the plurality of virtual machines to form a number of virtual machine groups, each of the virtual machine groups including virtual machines that previously accessed at least one of a plurality of memory pages, each of the plurality of memory pages including at least in part the identical memory page content portion.

Example 69 may include elements of example 68 where the machine-readable instructions that cause the virtual machine migration controller to selectively group at least some of the plurality of virtual machines to form a number of virtual machine groups may further cause the virtual machine migration controller to determine a hash value based at least in part on the content included in at least a portion of each of the plurality of memory pages, detect the at least two memory pages within the plurality of memory pages having similar hash values and identify the identical content included on each of the at least two pages for the detected at least two memory pages within the plurality of memory pages having similar hash values.

Example 70 may include elements of any of claims 62 through 66 where the machine-readable instructions that cause the virtual machine migration controller to selectively group at least some of the plurality of virtual machines to form a number of virtual machine groups may further cause the virtual machine migration controller to selectively group at least some of the plurality of virtual machines to form a number of virtual machine groups, each of the virtual machine groups including virtual machines that previously accessed at least one of a plurality of memory pages, each of the plurality of memory pages having identical memory page content.

Example 71 may include elements of example 70 where the machine-readable instructions that cause the virtual machine migration controller to selectively group at least some of the plurality of virtual machines to form a number of virtual machine groups may further cause the virtual machine migration controller to determine a hash value based at least in part on the content included in at least a portion of each of the plurality of memory pages, detect the at least two memory pages within the plurality of memory pages having similar hash values, and
identify the identical content included on each of the at least two pages for the detected at least two memory pages within the plurality of memory pages having similar hash values.

According to example 72, there is provided a system for migrating a plurality of virtual machines from a first host system to a second host system, the system being arranged to perform the method of any of examples 32 through 41.

According to example 73, there is provided a chipset arranged to perform the method of any of examples 32 through 41.

According to example 74, there is provided at least one machine readable medium comprising a plurality of instructions that, in response to be being executed on a computing device, cause the computing device to carry out the method according to any of examples 32 through 41.

According to example 75, there is provided a device configured for migrating a plurality of virtual machines from a first host system to a second host system, the device being arranged to perform the method of any of examples 32 through 41.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A live virtual machine migration system, comprising at least one controller circuit;
at least one storage device communicably coupled to the at least one controller circuit, the at least one storage device including machine-executable instructions that, when executed by the at least one controller circuit, cause the at least one controller circuit to provide a virtual machine migration controller, the virtual machine migration controller to:
determine a page dirtying rate for each of a plurality of virtual machines resident on a first host system;
determine memory page commonality for combinations of virtual machines of the plurality of virtual machines;
selectively group at least some of the plurality of virtual machines to form a plurality of virtual machine groups based on the memory page commonality, each of the virtual machine groups including two or more virtual machines that previously accessed at least one identical memory page content portion;
determine a projected migration time to migrate each of the plurality of virtual machine groups from the first host system to a second host system using:
the at least one identical memory page content portion;
the page dirtying rate for each of the two or more virtual machines included in the respective virtual machine group; and
available network bandwidth; and
select a batch of virtual machines to migrate together based on the projected migration time.

2. The live virtual machine migration system of claim 1, wherein the machine-executable instructions further cause the virtual machine migration controller to:
determine a migration order for each of the plurality of virtual machine groups by the virtual machine migration controller.

3. The live virtual machine migration system of claim 2, wherein the machine-executable instructions that cause the virtual machine migration controller to determine a migration order for each of the plurality of virtual machine groups, further cause the virtual machine migration controller to:
determine a migration order for each of the plurality of virtual machine groups based at least in part on the projected migration time for each respective one of the plurality of virtual machine groups.

4. The live virtual machine migration system of claim 2, wherein the machine-executable instructions further cause the virtual machine migration controller to:
selectively migrate each of the plurality of virtual machine groups from the first host system to the second host system in an order based at least in part on the predicted duration to migrate the respective virtual machine group at the available bandwidth.

5. The live virtual machine migration system of claim 1, wherein the machine-executable instructions that cause the virtual machine migration controller to determine a page dirtying rate for each of a plurality of virtual machines, further cause the virtual machine migration controller to:
determine a page dirtying rate for each of the virtual machines based on historical page dirtying by each respective one of the virtual machines over a defined time interval.

6. The live virtual machine migration system of claim 1, wherein the machine-executable instructions that cause the virtual machine migration controller to selectively group at least some of the plurality of virtual machines to form a number of virtual machine groups, further cause the virtual machine migration controller to:
selectively group each of the plurality of virtual machines into one of a number of virtual machine pairs, each virtual machine in a respective virtual machine pair accessing at least one identical memory page content portion.

7. The live virtual machine migration system of claim 1, wherein the machine-executable instructions that cause the virtual machine migration controller to selectively group at least some of the plurality of virtual machines to form the plurality of virtual machine groups, further causes the virtual machine migration controller to:
  selectively group at least some of the plurality of virtual machines to form the plurality of virtual machine groups, each of the plurality of virtual machine groups including two or more virtual machines that previously accessed at least one common memory page.

8. The live virtual machine migration system of claim 1, wherein the machine-executable instructions that cause the virtual machine migration controller to selectively group at least some of the plurality of virtual machines to form the plurality of virtual machine groups, further cause the virtual machine migration controller to:
  selectively group at least some of the plurality of virtual machines to form the plurality of virtual machine groups, each of the plurality of virtual machine groups including two or more virtual machines that previously accessed at least one of a plurality of memory pages, each of the plurality of memory pages including at least in part the identical memory page content portion.

9. The live virtual machine migration system of claim 8, wherein the machine-executable instructions that cause the virtual machine migration controller to selectively group at least some of the plurality of virtual machines to form the plurality of virtual machine groups, further cause the virtual machine migration controller to:
  determine a hash value based at least in part on thea content included in at least a portion of each of the plurality of memory pages;
  detect that at least two memory pages within the plurality of memory pages having similar hash values; and
  identify the identical content included on each of the at least two memory pages for the detected at least two memory pages within the plurality of memory pages having similar hash values.

10. The live virtual machine migration system of claim 1, wherein the machine-executable instructions that cause the virtual machine migration controller to selectively group at least some of the plurality of virtual machines to form the plurality of virtual machine groups, further cause the virtual machine migration controller to:
  selectively group at least some of the plurality of virtual machines to form the plurality of virtual machine groups, each of the plurality of virtual machine groups including two or more virtual machines that previously accessed at least one of a plurality of memory pages, each of the plurality of memory pages having identical memory page content.

11. The live virtual machine migration system of claim 10, wherein the machine-executable instructions that cause the virtual machine migration controller to selectively group at least some of the plurality of virtual machines to form the plurality of virtual machine groups, further cause the virtual machine migration controller to:
  determine a hash value based at least in part on the content included in at least a portion of each of the plurality of memory pages;
  detect that at least two memory pages within the plurality of memory pages having similar hash values; and
  identify the identical content included on each of the at least two memory pages for the detected at least two memory pages within the plurality of memory pages having similar hash values.

12. A live virtual machine migration method comprising:
  determining, by a virtual machine migration controller, a page dirtying rate for each of a plurality of virtual machines;
  determining memory page commonality for combinations of virtual machines of the plurality of virtual machines;
  selectively grouping, by the virtual machine migration controller, at least some of the plurality of virtual machines to form a plurality of virtual machine groups based on the memory page commonality, each of the virtual machine groups including two or more virtual machines that previously accessed at least one identical memory page content portion;
  determining, by the virtual machine migration controller a projected migration time for each of the plurality of virtual machine groups using:
    the at least one identical memory page content portion;
    the page dirtying rate for each of the two or more virtual machines included in the respective virtual machine group; and
    available network bandwidth; and
  selecting a batch of virtual machines to migrate together based on the projected migration time.

13. The live virtual machine migration method of claim 12, further comprising:
  determining a migration order for each of the plurality of virtual machine groups by the virtual machine migration controller.

14. The live virtual machine migration method of claim 13, wherein determining a migration order for each of the plurality of virtual machine groups comprises:
  determining, by the virtual machine migration controller, a migration order for each of the plurality of virtual machine groups based at least in part on the projected migration time for each respective one of the plurality of virtual machine groups.

15. The live virtual machine migration method of claim 13, wherein determining a page dirtying rate for each of a plurality of virtual machines comprises:
  determining, by the virtual machine migration controller, a page dirtying rate for each of the virtual machines based on historical page dirtying by each respective one of the virtual machines over a defined time interval.

16. The live virtual machine migration method of claim 12, wherein selectively grouping at least some of the plurality of virtual machines to form the plurality of virtual machine groups comprises:
  selectively grouping, by the virtual machine migration controller, each of the plurality of virtual machines into one of a number of virtual machine pairs, each virtual machine in a respective virtual machine pair accessing at least one identical memory page content portion.

17. The live virtual machine migration method of claim 12, wherein selectively grouping at least some of the plurality of virtual machines to form the plurality of virtual machine groups comprises:
  selectively grouping, by the virtual machine migration controller, at least some of the plurality of virtual machines to form the plurality of virtual machine groups, each of the plurality of virtual machine groups including two or more virtual machines that previously accessed at least one common memory page.

18. The live virtual machine migration method of claim 12, wherein selectively grouping at least some of the plurality of virtual machines to form the plurality of virtual machine groups comprises:
  selectively grouping, by the virtual machine migration controller, at least some of the plurality of virtual machines to form the plurality of virtual machine groups, each of the plurality of virtual machine groups including two or more virtual machines that previously accessed at least one of a plurality of memory pages, each of the plurality of memory pages including at least in part the identical memory page content portion.

19. The live virtual machine migration method of claim 18, wherein selectively grouping at least some of the plurality of virtual machines to form the plurality of virtual machine groups comprises:
   determining a hash value based at least in part on the content included in at least a portion of each of the plurality of memory pages;
   detecting that at least two memory pages within the plurality of memory pages having similar hash values; and
   identifying the identical content included on each of the at least two memory pages for the detected at least two memory pages within the plurality of memory pages having similar hash values.

20. The live virtual machine migration method of claim 12, wherein selectively grouping at least some of the plurality of virtual machines to form the plurality of virtual machine groups comprises:
   selectively grouping, by the virtual machine migration controller, at least some of the plurality of virtual machines to form the plurality of virtual machine groups, each of the plurality of virtual machine groups including two or more virtual machines that previously accessed at least one of a plurality of memory pages, each of the plurality of memory pages having identical memory page content.

21. The live virtual machine migration method of claim 20, wherein selectively grouping at least some of the plurality of virtual machines to form the plurality of virtual machine groups comprises:
   determining a hash value based at least in part on the content included in at least a portion of each of the plurality of memory pages;
   detecting that at least two memory pages within the plurality of memory pages having similar hash values; and
   identifying the identical content included on each of the at least two memory pages for the detected at least two memory pages within the plurality of memory pages having similar hash values.

22. A storage device that includes machine readable instructions that, when executed by a circuit, cause the circuit to provide a virtual machine migration controller, the virtual machine migration controller to:
   determine a page dirtying rate for each of a plurality of virtual machines;
   determine memory page commonality for combinations of virtual machines of the plurality of virtual machines;
   selectively group at least some of the plurality of virtual machines to form a plurality of virtual machine groups based on the memory page commonality, each of the virtual machine groups including two or more virtual machines that previously accessed at least one identical memory page content portion;
   determine a projected migration time for each of the plurality of virtual machine groups using:
      the at least one identical memory page content portion;
      the page dirtying rate for each of the two or more virtual machines included in the respective virtual machine group; and
      available network bandwidth; and
   select a batch of virtual machines to migrate together based on the projected migration time.

23. The storage device of claim 22, further comprising machine readable instructions that, when executed by the virtual machine migration controller, cause the virtual machine migration controller to:
   determine a migration order for each of the plurality of virtual machine groups.

24. The storage device of claim 23, wherein the machine-readable instructions that cause the virtual machine migration controller to determine a migration order for each of the plurality of virtual machine groups further cause the virtual machine migration controller to:
   determine a migration order for each of the plurality of virtual machine groups based at least in part on the projected migration time for each respective one of the plurality of virtual machine groups.

25. The storage device of claim 23, wherein the machine-readable instructions that cause the virtual machine migration controller to determine a page dirtying rate for each of a plurality of virtual machines further cause the virtual machine migration controller to:
   determine a page dirtying rate for each of the plurality of virtual machines based on historical page dirtying by each respective one of the plurality of virtual machines over a defined time interval.

* * * * *